(12) United States Patent
Liu et al.

(10) Patent No.: US 11,225,291 B2
(45) Date of Patent: Jan. 18, 2022

(54) VEHICLE BODY STRUCTURE AND VEHICLE

(71) Applicant: BYD COMPANY LIMITED, Guangdong (CN)

(72) Inventors: Xinchun Liu, Shenzhen (CN); Ming Ji, Shenzhen (CN); Cheng Xu, Shenzhen (CN); Maoyan Liang, Shenzhen (CN); Rongtian Deng, Shenzhen (CN)

(73) Assignee: BYD COMPANY LIMITED, Guangdong (CN)

( * ) Notice: Subject to any disclaimer, the term of this patent is extended or adjusted under 35 U.S.C. 154(b) by 116 days.

(21) Appl. No.: 16/626,738

(22) PCT Filed: Jun. 28, 2018

(86) PCT No.: PCT/CN2018/093264
§ 371 (c)(1),
(2) Date: Dec. 26, 2019

(87) PCT Pub. No.: WO2019/001493
PCT Pub. Date: Jan. 3, 2019

(65) Prior Publication Data
US 2020/0114978 A1 Apr. 16, 2020

(30) Foreign Application Priority Data
Jun. 30, 2017 (CN) .......................... 201710527395.4

(51) Int. Cl.
*B62D 25/20* (2006.01)
*B62D 21/02* (2006.01)
*B62D 21/15* (2006.01)

(52) U.S. Cl.
CPC ......... *B62D 25/2036* (2013.01); *B62D 21/02* (2013.01); *B62D 21/152* (2013.01); *B60Y 2306/01* (2013.01)

(58) Field of Classification Search
CPC .. B62D 25/2036; B62D 21/02; B62D 21/152; B60Y 2306/01
(Continued)

(56) References Cited

U.S. PATENT DOCUMENTS 8,007,032 B1 * 8/2011 Craig ................... B62D 21/157
296/187.12
8,632,121 B1 * 1/2014 Sundararajan ....... B62D 21/157
296/187.08
(Continued)

FOREIGN PATENT DOCUMENTS

| CN | 101823509 A | 9/2010 |
| CN | 202781929 U | 8/2012 |

(Continued)

OTHER PUBLICATIONS

English Translation of International Search Report from PCT/CN2018/093264 dated Oct. 8, 2018 (3 pages).

*Primary Examiner* — D Glenn Dayoan
*Assistant Examiner* — E Turner Hicks

(57) ABSTRACT

A vehicle body structure and a vehicle are provided. The vehicle body structure includes two sill inner plates disposed at intervals along a left-right direction, two strengthening longitudinal beams disposed at intervals along the left-right direction, and at least one strengthening crossbeam. Each strengthening longitudinal beam is connected to one corresponding sill inner plate, and each strengthening crossbeam is connected to the two strengthening longitudinal beams.

20 Claims, 42 Drawing Sheets

(58) Field of Classification Search
USPC .............. 296/187.12, 193.05, 204, 209, 30
See application file for complete search history.

(56) References Cited

U.S. PATENT DOCUMENTS

| | | | | |
|---|---|---|---|---|
| 9,505,442 | B2* | 11/2016 | Wu | ........................ B60K 1/04 |
| 9,821,852 | B2* | 11/2017 | Akhlaque-e-rasul | .... B60K 1/04 |
| 10,272,955 | B2* | 4/2019 | Fritz | ................... B62D 25/025 |
| 2016/0137228 | A1* | 5/2016 | Atsumi | ................. B62D 25/20 |
| | | | | 296/204 |
| 2016/0207568 | A1* | 7/2016 | Natsume | ............... B62D 21/06 |

FOREIGN PATENT DOCUMENTS

| | | |
|---|---|---|
| CN | 102958786 A | 3/2013 |
| CN | 203497026 U | 3/2014 |
| CN | 103707938 A | 4/2014 |
| CN | 104002875 A | 8/2014 |
| CN | 104118336 A | 10/2014 |
| CN | 204354854 U | 5/2015 |
| CN | 205186312 U | 4/2016 |
| CN | 105966468 A | 9/2016 |
| CN | 205589329 U | 9/2016 |
| CN | 206012745 U | 3/2017 |
| CN | 106697065 A | 5/2017 |
| CN | 106809286 A | 6/2017 |
| CN | 206984131 U | 2/2018 |
| JP | 2000318654 A | 11/2000 |

\* cited by examiner

VEHICLE BODY STRUCTURE AND VEHICLE

CROSS-REFERENCE TO RELATED APPLICATIONS

This application is based on International Application No. PCT/CN2018/093264, filed on Jun. 28, 2018, which claims priority to and benefits of Chinese Patent Application No. 201710527395.4, filed with the State Intellectual Property Office of P. R. China on Jun. 30, 2017. The entire contents of the above-referenced applications are incorporated herein by reference.

FIELD

The present disclosure relates to the field of vehicles, and in particular, to a vehicle body structure and a vehicle.

BACKGROUND

To minimize mortality and injury severity of passengers in a traffic (collision) accident of a vehicle (particularly, a passenger vehicle) is a core design technology of vehicle development and production. The design of a collision safety deformation structure is the basis for improving the collision safety performance of vehicles. To meet the increasingly high requirement of the public on the collision safety of family passenger vehicles, in recent years, related departments of countries continuously and gradually improve and add some test conditions of the collision safety performance of passenger vehicles in domestic related regulations and evaluation criteria. For example, the United States has updated a series of regulations and evaluation criteria related to the collision safety performance for vehicles sold in the domestic market, which requires the passenger compartment of the vehicle body to bear a larger collision force and have a smaller deformation under more working conditions.

As the family passenger vehicles are widespread in the global market, environmental protection problems caused by the shortage and burning of fossil energy are increasingly severe. Therefore, countries are actively developing new energy vehicles. Electric vehicles are becoming a future trend as a direction of the new energy vehicles. In addition to meeting the conventional design, designing a longer endurance mileage for the electric vehicles needs to be taken into consideration, to contend with the conventional fuel vehicles.

In addition, with the rapid development of electric vehicles in recent years, to improve the endurance mileage, more energy storage batteries need to be equipped on an electric vehicle. In this way, compared with a fuel vehicle with a same specification, the weight of the electric vehicle is greatly increased, so that under a same test condition, kinetic energy of the vehicle in an early stage of a collision is increased. That is, a vehicle body structure of the electric vehicle needs to bear larger forces and absorb more kinetic energy to improve the safety. Further, because a storage battery pack needs to be disposed in the electric vehicle, much space under the vehicle body is occupied, and various classic vehicle body collision safety technologies of the conventional fuel vehicles cannot be used. Therefore, a new vehicle body structure technology that can meet the storage battery deployment and the vehicle safety needs to be designed.

SUMMARY

One objective of the present disclosure is to provide a vehicle body structure with higher collision safety performance.

Another objective of the present disclosure is to provide a vehicle including the foregoing vehicle body structure.

To achieve the foregoing objectives, the present disclosure provides a vehicle body structure, including two sill inner plates disposed at intervals along a left-right direction, two strengthening longitudinal beams disposed at intervals along the left-right direction, and at least one strengthening crossbeam, where each strengthening longitudinal beam is connected to one corresponding sill inner plate, and each strengthening crossbeam is connected to the two strengthening longitudinal beams.

By using the foregoing technical solution, when a side wall collision occurs to the vehicle of the, by connecting the strengthening longitudinal beam to the sill inner plate and connecting the strengthening longitudinal beams on two sides through the strengthening crossbeams, on one hand, the flipping deformation of the sill inner plate can be effectively reduced, so that the intruding deformation of a B pillar (connected to the sill inner plate) in an in-vehicle direction is reduced, and possible damages to the passengers are decreased; and on the other hand, horizontal deformations of the floor panel and the sill inner plate can be obviously reduced, the passengers are prevented from being hurt, and a battery pack disposed below the floor panel is prevented from being damaged. When a side pillar collision occur to the vehicle, by using a sill support structure formed by the strengthening crossbeams and the strengthening longitudinal beams, not only the strength of the vehicle body structure can be effectively improved, but also the collision force can be directly transferred from the sill inner plate on one side to the sill inner plate on the other side, so that horizontal deformations of the floor panel and the sill inner plate can be obviously reduced, the passengers are prevented from being hurt, and the battery pack disposed below the floor panel is prevented from being damaged. In addition, when the side pillar collision occurs to the vehicle, the collision force can be transferred to the other side through the strengthening crossbeam as long as a collision point is within a range of the strengthening longitudinal beam.

The present disclosure further provides a vehicle, where the vehicle includes the foregoing vehicle body structure.

Other features and advantages of the present disclosure are described in detail in the Detailed Description part below.

BRIEF DESCRIPTION OF THE DRAWINGS

The accompanying drawings are used to provide a further understanding of the present disclosure, constitute a part of this specification, and are used, together with the following specific implementations, to explain the present disclosure, but do not constitute limitations to the present disclosure. In the accompanying drawings.

DETAILED DESCRIPTION

Figure 1:
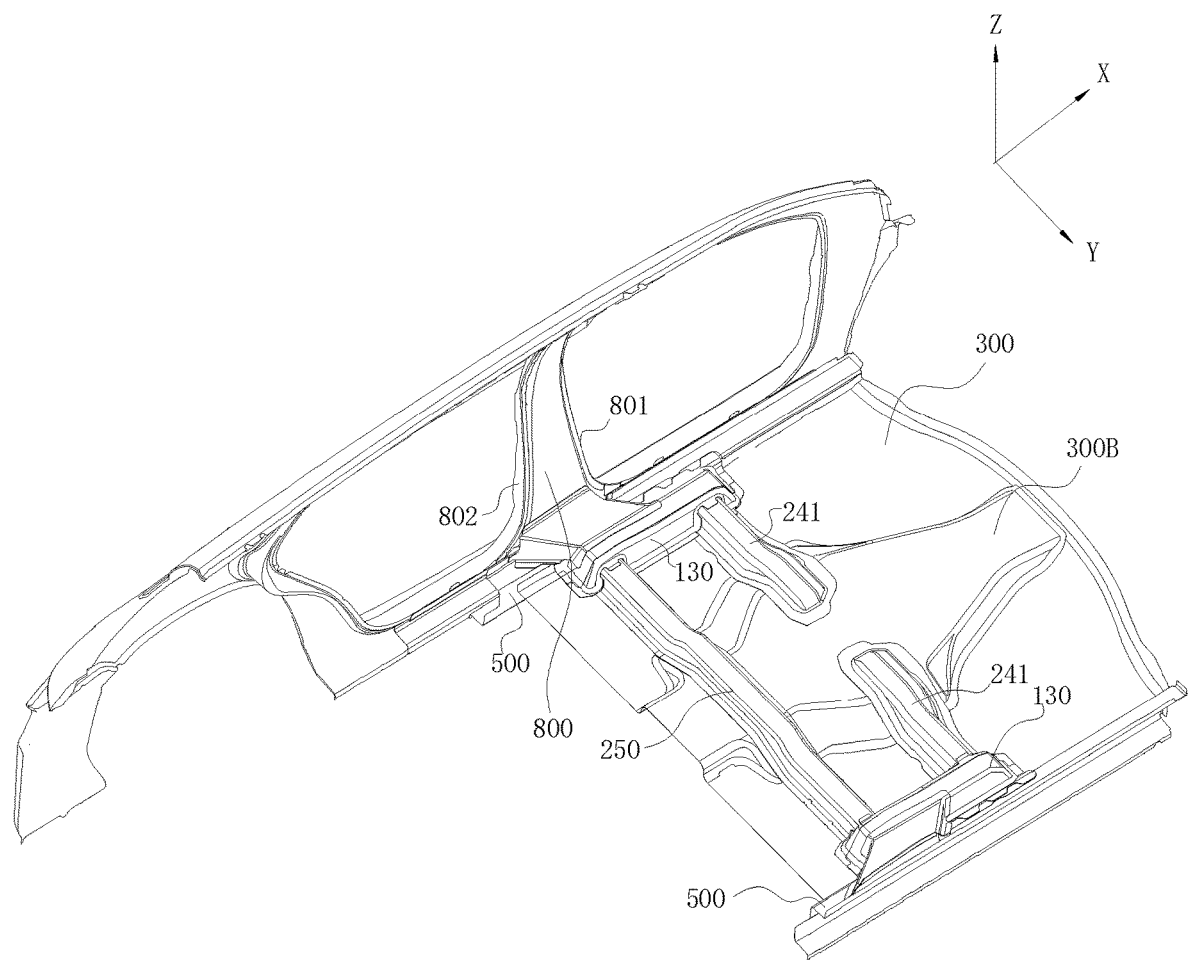
FIG. 1 is a three-dimensional top view of a vehicle body structure according to a first implementation of the present disclosure.

Specific implementations of the present disclosure are described in detail below with reference to the accompanying drawings. It should be understood that the specific implementations described herein are merely used to describe and explain the present disclosure rather than limiting the present disclosure.

In the present disclosure, unless otherwise specified, location words used such as "up, down, left, right, front, and rear" are defined on the basis of an up-down direction, a left-right direction, and a front-rear direction of a vehicle. Specifically, in the drawings, an X direction is a front-rear direction of the vehicle, that is, a longitudinal direction of the vehicle, where one side pointed by an arrow is "front", and the opposite is "rear"; a Y direction is a left-right direction of the vehicle, that is, a horizontal direction of the vehicle, where one side pointed by an arrow is "right", and the opposite is "left"; and a Z direction is an up-down direction of the vehicle, and that is, the height direction of the vehicle, where one side pointed by an arrow is "up", and the opposite is "down". "Inner and outer" are defined on the basis of contours of corresponding components. For example, in-vehicle and out-vehicle are defined on the basis of a contour of a vehicle, where one side close to the middle of the vehicle is "inner", and the opposite is "outer". The foregoing definitions are merely used to help describe the present disclosure, and should not be understood as a limitation to the present disclosure.

All "crossbeams" in the present disclosure refer to beams generally extending along the left-right direction of the vehicle, and all "longitudinal beams" refer to beams generally extending along the front-rear direction of the vehicle. In addition, unless otherwise specified, meanings of nouns such as "floor panel", "sill inner plate", "A pillar", "B pillar", and "rear anti-collision crossbeam" involved in the implementations of the present disclosure are meanings known in the art.

In addition, unless otherwise specified and limited, terms "connected", "linked", "fixed", and the like should be understood in a broad sense, and may be implemented in a non-removable manner such as welding, or in a removable manner such as bolt, or in an integrally formed manner such as moulding.

Figure 2:
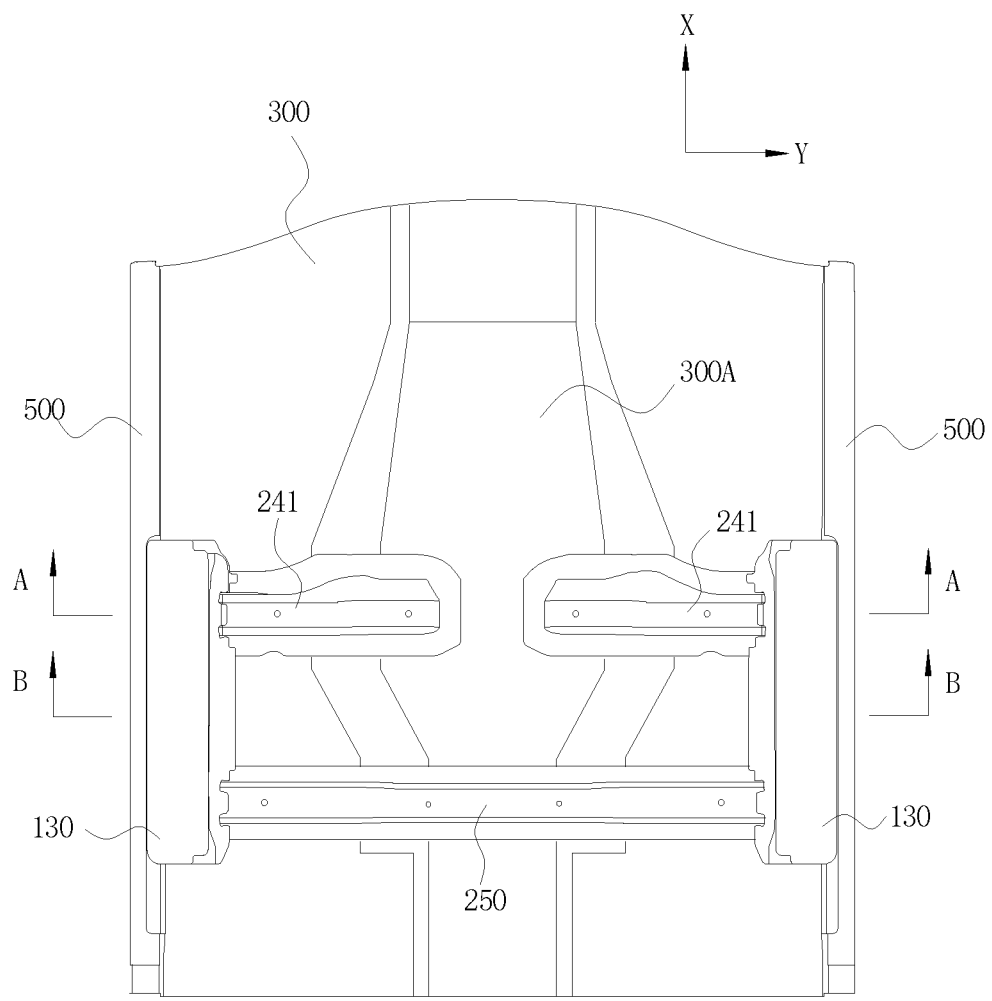
FIG. 2 is a top view of the vehicle body structure according to the first implementation of the present disclosure.
Figure 3:
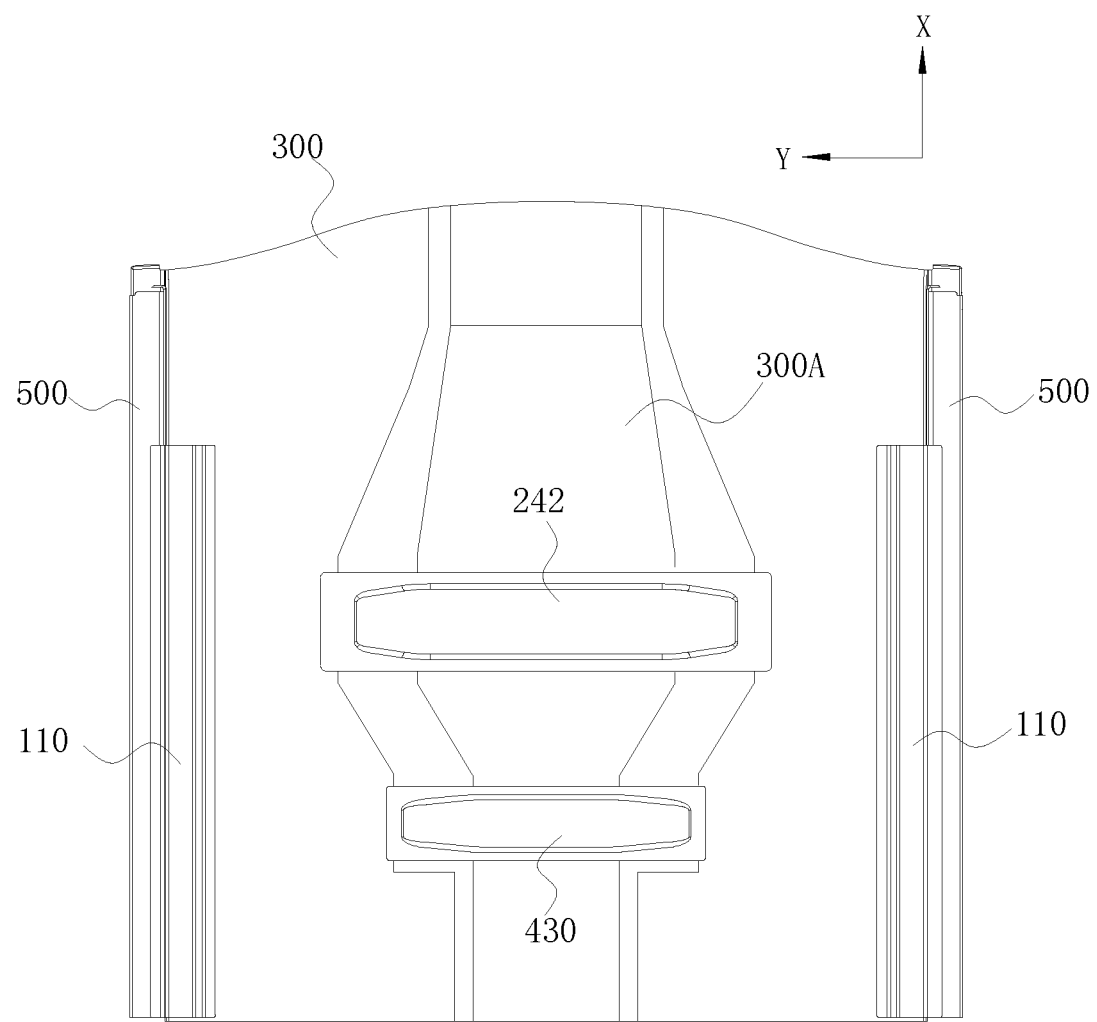
FIG. 3 is a bottom view of the vehicle body structure according to the first implementation of the present disclosure.
Figure 4:
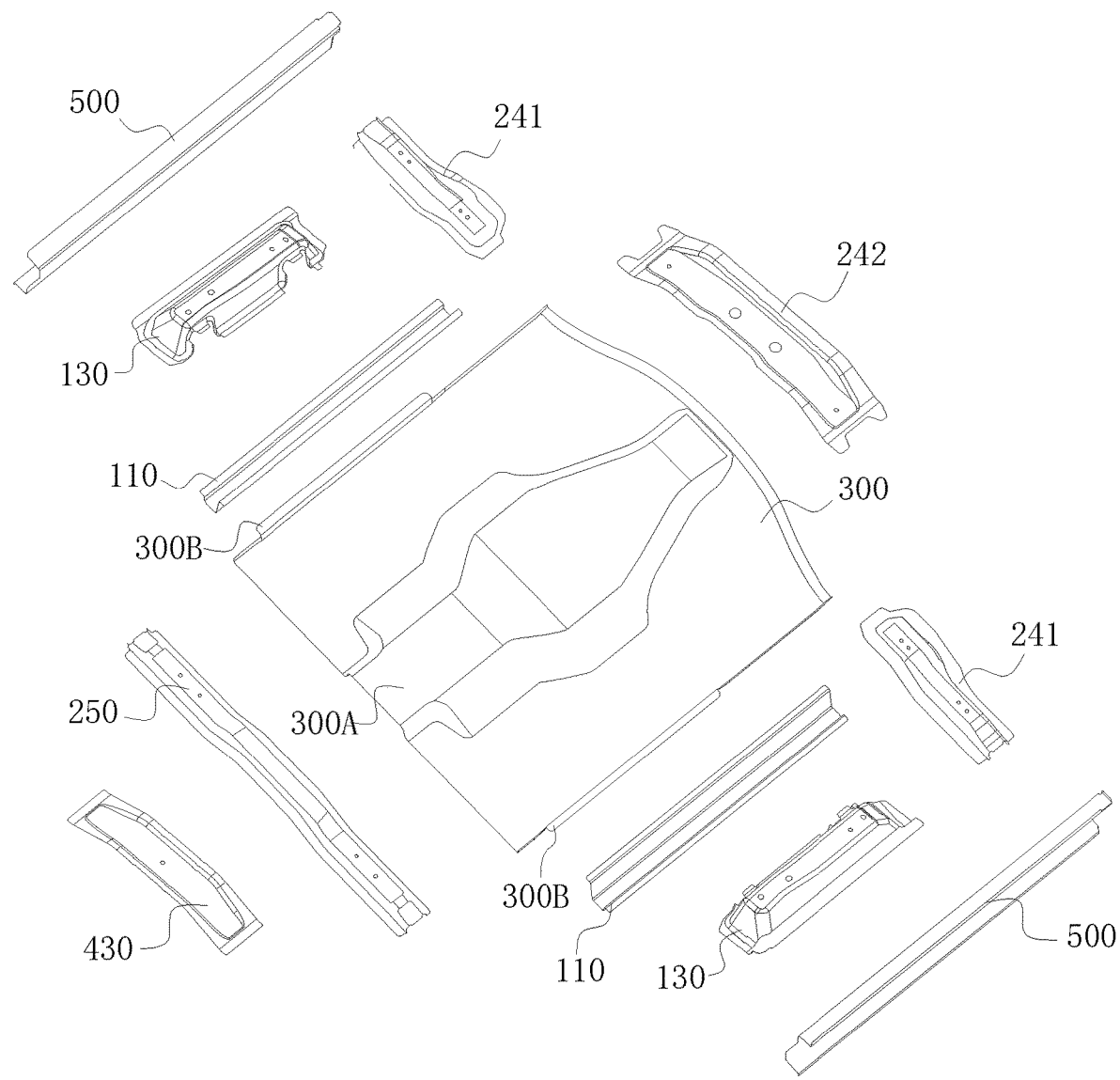
FIG. 4 is an exploded view of the vehicle body structure according to the first implementation of the present disclosure.

FIG. 1 is a three-dimensional top view of a vehicle body structure according to a first implementation of the present disclosure. FIG. 2 is a top view of the vehicle body structure according to the first implementation of the present disclosure. FIG. 3 is a bottom view of the vehicle body structure according to the first implementation of the present disclosure. FIG. 4 is an exploded view of the vehicle body structure according to the first implementation of the present disclosure. In the vehicle body structure according to the first implementation of the present disclosure, as shown in FIG. 1 and FIG. 4, the vehicle body structure includes two sill inner plates 500 disposed at intervals along a left-right direction, two strengthening longitudinal beams 130 disposed at intervals along the left-right direction, and strengthening crossbeams 240 and 250 disposed at intervals along a front-rear direction. The two sill inner plates 500 are respectively disposed on a left side and a right side of a floor panel 300, and each strengthening longitudinal beam 130 is connected to one corresponding sill inner plate 500, to strengthen the sill inner plate 500. Each strengthening crossbeam is connected to two strengthening longitudinal beams 130, and the strengthening crossbeams 240 and 250 connect the strengthening longitudinal beams 130 on the left side and the right side. The strengthening crossbeams 240 and 250 are respectively connected to the two strengthening longitudinal beams 130 to encircle a square-shaped closed-loop frame, and the closed-loop frame is supported between the sill inner plates 500 on the left side and the right side.

By using the foregoing technical solution, when a side wall collision occurs to the vehicle, by connecting the strengthening longitudinal beam 130 to the sill inner plate 500 and connecting the strengthening longitudinal beams 130 on two sides through the strengthening crossbeams 240 and 250, on one hand, the flipping deformation of the sill inner plate 500 can be effectively reduced, so that the intruding deformation of a B pillar 800 (connected to the sill inner plate 500) in an in-vehicle direction is reduced, and possible damages to the passengers are decreased; and on the other hand, horizontal deformations of the floor panel 300 and the sill inner plate 500 can be obviously reduced, the passengers are prevented from being hurt, and a battery pack disposed below the floor panel 300 is prevented from being damaged.

When a side pillar collision occurs to the vehicle, by using the square-shaped closed-loop frame encircled by the strengthening crossbeams 240 and 250 and the two strengthening longitudinal beams 130, not only the strength of the vehicle body structure can be effectively improved, but also the collision force can be directly transferred from the sill inner plate 500 on one side to the sill inner plate 500 on the other side, so that horizontal deformations of the floor panel 300 and the sill inner plate 500 can be obviously reduced, the passengers are prevented from being hurt, and the battery pack disposed below the floor panel 300 is prevented from being damaged. In addition, when the side pillar collision occurs to the vehicle, the collision force can be transferred to the other side through the strengthening crossbeams 240 and 250 as long as a collision point is within a range of the strengthening longitudinal beam 130.

Especially, in the square-shaped closed-loop frame encircled by the strengthening crossbeams 240 and 250 and the two strengthening longitudinal beams 130, two ends of each strengthening longitudinal beam 130 are respectively supported by one strengthening crossbeam, so that the strengthening longitudinal beam 130 has relatively high strength and rigidity. When the side pillar collision occurs, the strengthening longitudinal beam 130 can more effectively transfer the collision force to the strengthening crossbeams 240 and 250.

In this implementation, as shown in FIG. 1 and FIG. 2, the strengthening longitudinal beam 130 is disposed above the floor panel 300. In other implementations, the strengthening longitudinal beam 130 may be alternatively disposed below the floor panel 300. One side of each strengthening longitudinal beam 130 may be connected to one corresponding sill inner plate 500, and the other side may be connected to the floor panel 300.

In this implementation, to improve the mounting strength of a front seat and ensure the safety of front passengers, a front seat mounting point may be disposed on the strengthening crossbeams 240 and 250. That is, the strengthening crossbeams 240 and 250 may be respectively a front seat front mounting crossbeam and a front seat rear mounting crossbeam. Certainly, in other implementations, the front seat mounting point may be alternatively disposed in a region encircled by the strengthening crossbeams 240 and 250 and the two strengthening longitudinal beams 130.

When the strengthening longitudinal beam 130 is disposed below the floor panel 300, the strengthening crossbeams 240 and 250 may be disposed below the floor panel 300 and connected to a lower surface of the floor panel 300. In this case, if the strengthening crossbeams 240 and 250 are used as the front seat front mounting crossbeam and the front seat rear mounting crossbeam, holes may be opened at positions that are on the floor panel 300 and that correspond to the strengthening crossbeams, so that a fastener can pass through the floor panel 300 to connect to the strengthening crossbeams.

In this implementation, the strengthening longitudinal beam 130 may be disposed at any proper longitudinal position of the sill inner plate 500. As shown in FIG. 1, for example, the strengthening longitudinal beam 130 may be disposed at a position generally corresponding to the B pillar 800.

Figure 13:
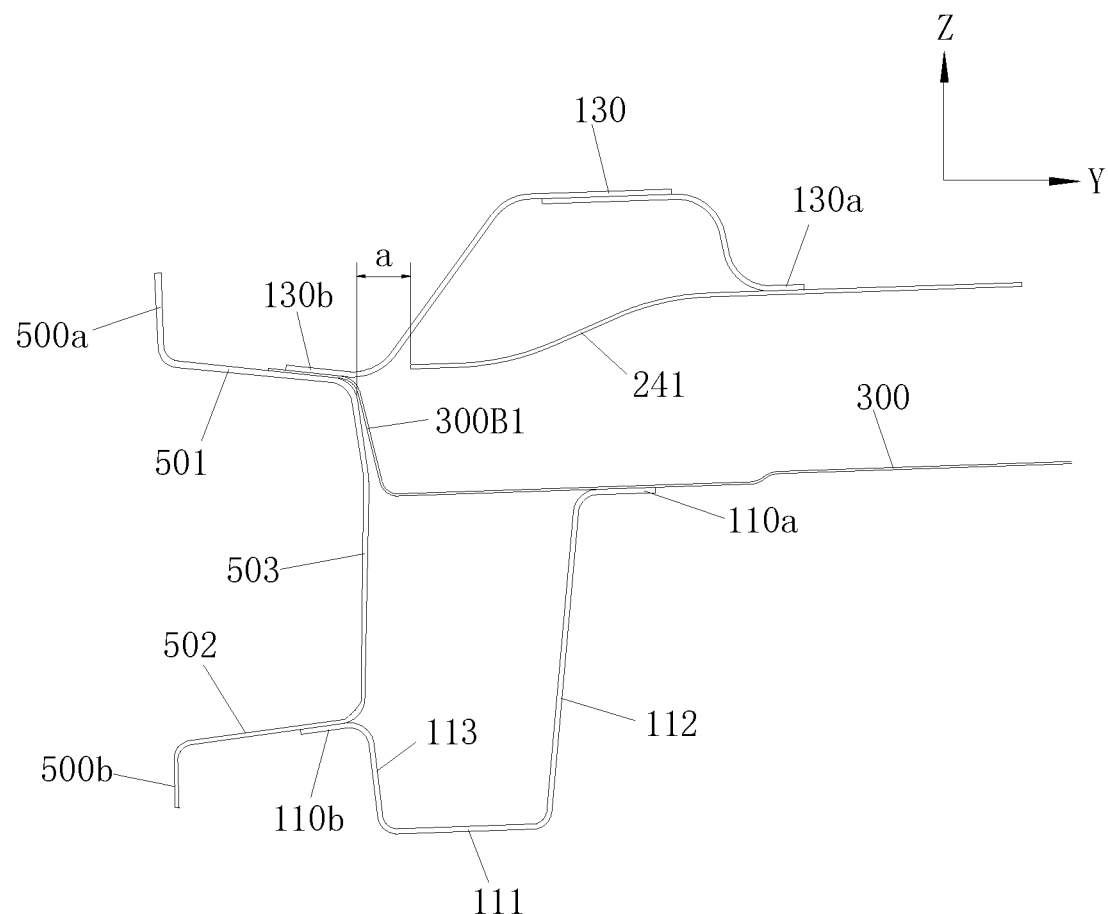
FIG. 13 is an enlarged view of a part C in FIG. 12.

In this implementation, as shown in FIG. 13, the sill inner plate 500 may be formed as a U-shaped groove structure opening outward and include an inner plate top wall 501 and an inner plate bottom wall 502 that are disposed opposite to each other, and an inner plate side wall 503 connected between the inner plate top wall 501 and the inner plate bottom wall 502. An inner plate upper flanging 500a folded upward is formed at an outer edge of the inner plate top wall 501, and an inner plate lower flanging 500b folded downward is formed at an outer edge of the inner plate bottom wall 502. The inner plate upper flanging 500a may be overlapped with the B pillar 800 at a position corresponding to the B pillar 800.

Because the B pillar 800 is connected to the sill inner plate 500, by disposing the strengthening longitudinal beam 130 at a position generally corresponding to the B pillar 800, a connected part of the sill inner plate 500 and the B pillar 800 can be pointedly strengthened, so that the intruding deformation of the B pillar 800 in an in-vehicle direction can be more effectively reduced.

Specifically, a front end of the strengthening longitudinal beam 130 may be located in front of a front edge 801 of the B pillar 800, a rear end of the strengthening longitudinal beam 130 may be located between the front edge 801 and a rear edge 802 of the B pillar 800. For example, the length of the strengthening longitudinal beam 130 may be 300 to 500 mm. In some possible implementations, the front end of the strengthening longitudinal beam 130 may extend to a position corresponding to an A pillar, and the rear end may extend to a back seat mounting crossbeam.

A spacing (that is, a distance between a rear edge of the strengthening crossbeam 240 and a front edge of the strengthening crossbeam 250) between the strengthening crossbeams 240 and 250 may be 250 to 350 mm, and a rear strengthening crossbeam 250 of the two strengthening crossbeams may generally correspond to the B pillar 800 in a horizontal direction of the vehicle. In some possible implementations, the strengthening crossbeam 240 may move forward to a position corresponding to the A pillar, and the strengthening crossbeam 250 may move backward to the front of the back seat mounting crossbeam and be disposed adjacent to the back seat mounting crossbeam.

Figure 16:
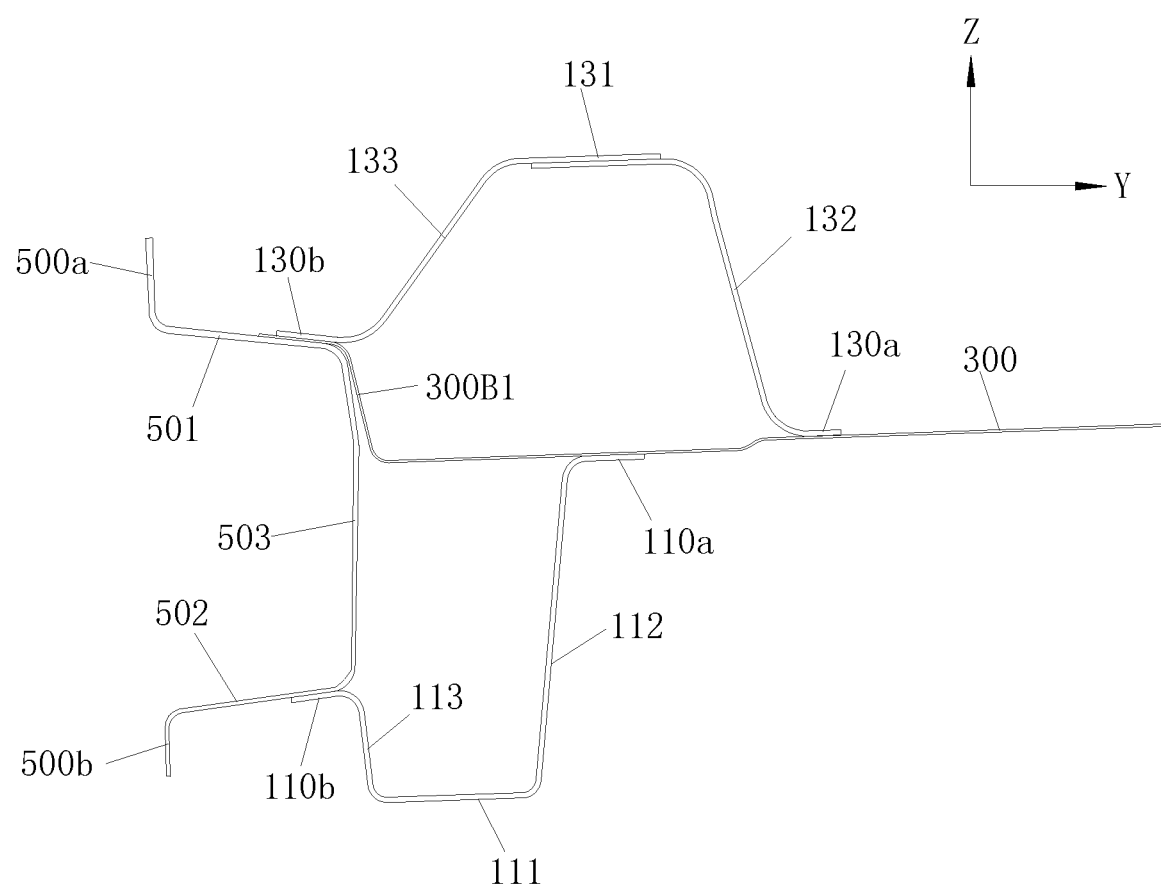
FIG. 16 is an enlarged view of a part D in FIG. 15.

The strengthening longitudinal beam 130 may have various proper structures, and this is not limited in the present disclosure. In this implementation, to make the strengthening longitudinal beam 130 have higher structural strength, as shown in FIG. 5 and FIG. 16, the strengthening longitudinal beam 130 may be formed as a groove-shaped structure opening downward, and include a strengthening longitudinal beam inner side wall 132 and a strengthening longitudinal beam outer side wall 133 that are disposed opposite to each other, and a strengthening longitudinal beam top wall 131 connecting the strengthening longitudinal beam inner side wall 132 and the strengthening longitudinal beam outer side wall 133.

In this case, to facilitate the connection between the sill inner plate 500 and the floor panel 300, a strengthening longitudinal beam inner side flanging 130a may be formed at a lower edge of the strengthening longitudinal beam inner side wall 132, and a strengthening longitudinal beam outer side flanging 130b may be formed at a lower edge of the strengthening longitudinal beam outer side wall 133. The strengthening longitudinal beam inner side flanging 130a is overlapped with an upper surface of the floor panel 300, the strengthening longitudinal beam outer side flanging 130b is overlapped with the inner plate top wall 501 of the sill inner plate 500, and the position of the strengthening longitudinal beam outer side flanging 130b may be higher than the position of the strengthening longitudinal beam inner side flanging 130a.

Figure 5:
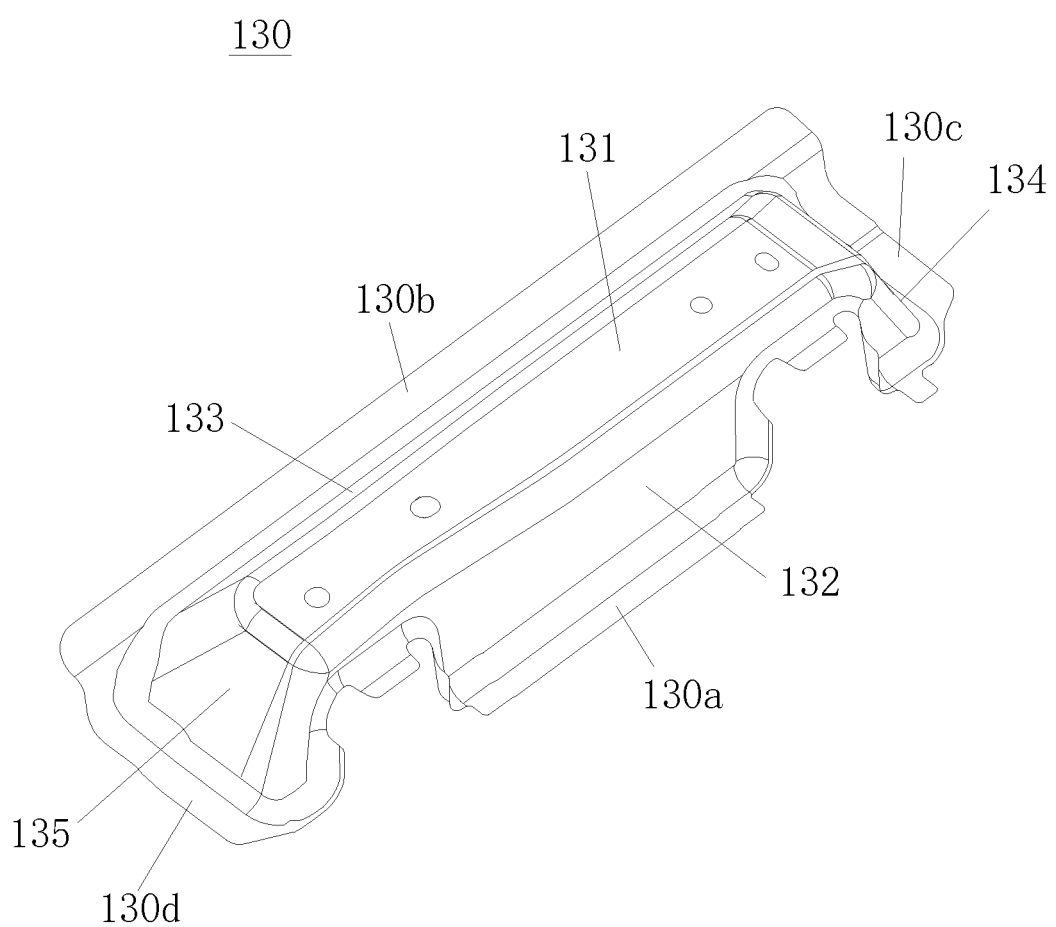
FIG. 5 is a three-dimensional view of a strengthening longitudinal beam of the vehicle body structure according to the first implementation of the present disclosure.

Further, as shown in FIG. 5, the strengthening longitudinal beam 130 may be formed as a groove-shaped structure with a closed front end and a closed rear end, and further include a strengthening longitudinal beam front end wall 134 and a strengthening longitudinal beam rear end wall 135 that are disposed opposite to each other. The strengthening longitudinal beam front end wall 134 is formed at a front edge of the strengthening longitudinal beam top wall 131 and connected to the strengthening longitudinal beam inner side wall 132 and the strengthening longitudinal beam outer side wall 133, the strengthening longitudinal beam rear end wall 135 is formed at a rear edge of the strengthening longitudinal beam top wall 131 and connected to the strengthening longitudinal beam inner side wall 132 and the strengthening longitudinal beam outer side wall 133, a strengthening longitudinal beam front end flanging 130c is formed at a lower edge of the strengthening longitudinal beam front end wall 134, a strengthening longitudinal beam rear end flanging 130d is formed at a lower edge of the strengthening longitudinal beam rear end wall 135, and the strengthening longitudinal beam front end flanging 130c and the strengthening longitudinal beam rear end flanging 130d are both overlapped with the upper surface of the floor panel 300. By designing the strengthening longitudinal beam 130 as a groove-shaped structure with two ends closed, on one hand, the strength of the strengthening longitudinal beam 130 is further improved, which facilitates the transfer of the collision force during the side collision; and on the other hand, the interior of the strengthening longitudinal beam 130 is formed as a closed space, so that there is no junk entered, and air flows are not generated in the interior of the strengthening longitudinal beam 130 when the vehicle is moving, thereby reducing noise.

Figure 6:
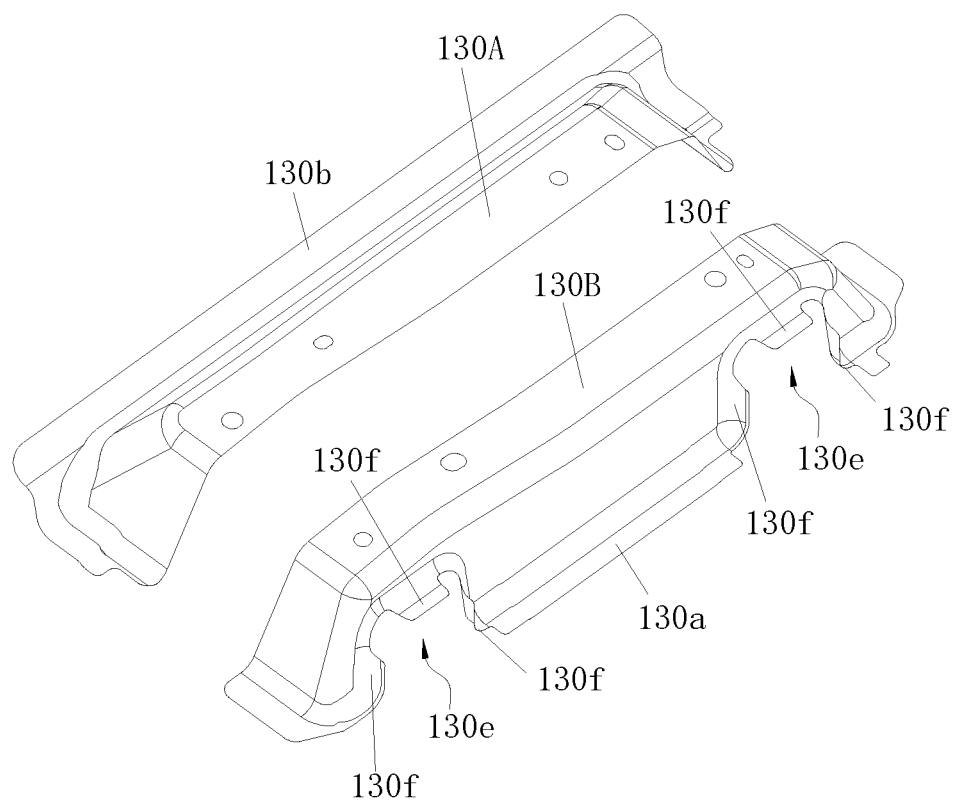
FIG. 6 is an exploded view of the strengthening longitudinal beam of the vehicle body structure according to the first implementation of the present disclosure.

The strengthening longitudinal beam 130 may be integrally formed, or may be formed by connecting a plurality of parts. In this implementation, for ease of manufacturing, as shown in FIG. 6, the strengthening longitudinal beam 130 may be divided into an outer semi-body 130A and an inner semi-body 130B along the horizontal direction of the strengthening longitudinal beam. The outer semi-body 130A is overlapped with the inner semi-body 130B. The strengthening longitudinal beam outer side wall 133 and the strengthening longitudinal beam outer side flanging 130b are formed on the outer semi-body 130A, and the strengthening longitudinal beam inner side wall 132 and the strengthening longitudinal beam inner side flanging 130a are formed on the inner semi-body 130B.

Figure 11:
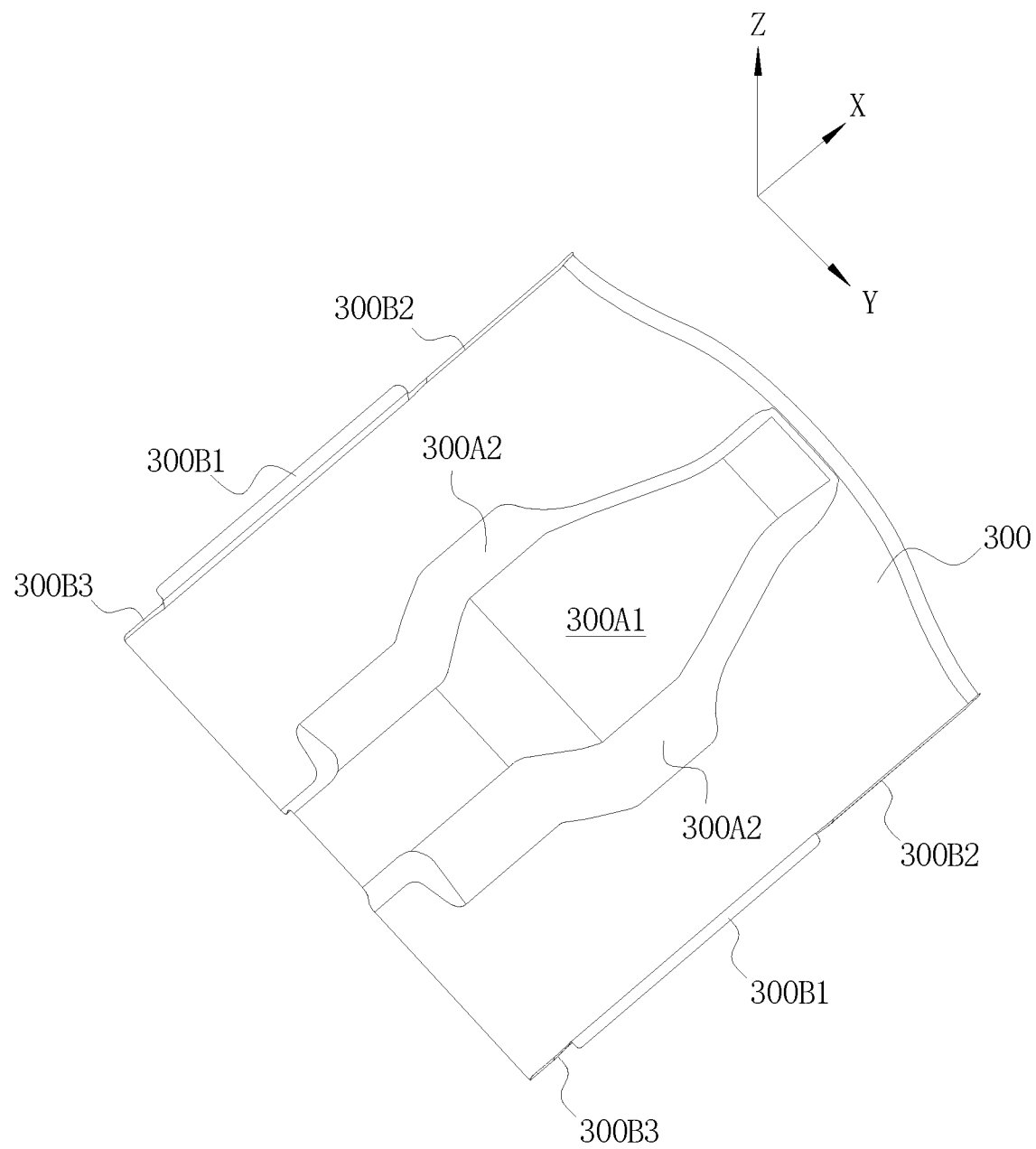
FIG. 11 is a three-dimensional view of a floor panel of the vehicle body structure according to the first implementation of the present disclosure.
Figure 12:
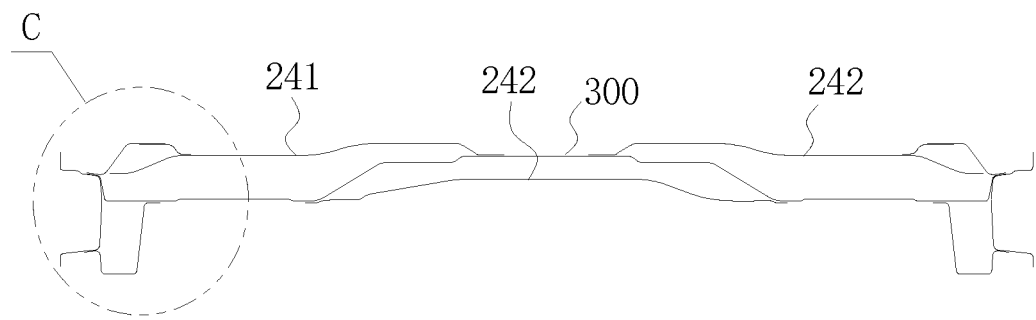
FIG. 12 is an A-A cross sectional view of FIG. 2.

As shown in FIG. 11 and FIG. 13, to facilitate the connection to the sill inner plate 500, the left side and the right side of the floor panel 300 may have a floor panel flanging 300B. In an implementation, a part of the floor panel flanging 300B corresponding to the position of the strengthening longitudinal beam 130 has an L-shaped cross section, and the remaining parts have a cross section in a shape of a horizontal line.

In other words, as shown in FIG. 11, the floor panel flanging 300B may include a first segment flanging 300B1 corresponding to the position of the strengthening longitudinal beam 130, and a second segment flanging 300B2 located in front of the first segment flanging 300B1 and/or a third segment flanging 300B3 located behind the first segment flanging 300B1. The cross section of the first segment flanging 300B1 is L-shaped (that is, first folded upward, and then folded outward), to be overlapped with a top wall of the inner plate top wall 501 of the sill inner plate 500. The cross section of the second segment flanging 300B2 and/or the third segment flanging 300B3 may be in a shape of a horizontal line (that is, folded upward), to be overlapped with the inner plate side wall 503 of the sill inner plate 500. In this case, to ensure the reliability of the connection between the strengthening longitudinal beam 130 and the sill inner plate 500, and improve the collision safety performance of the vehicle body structure, the outer side flanging 130b of the strengthening longitudinal beam, the first segment flanging 300B1, and the inner plate top wall 501 of the sill inner plate 500 may be welded together by means of stitch welding.

Figure 14:
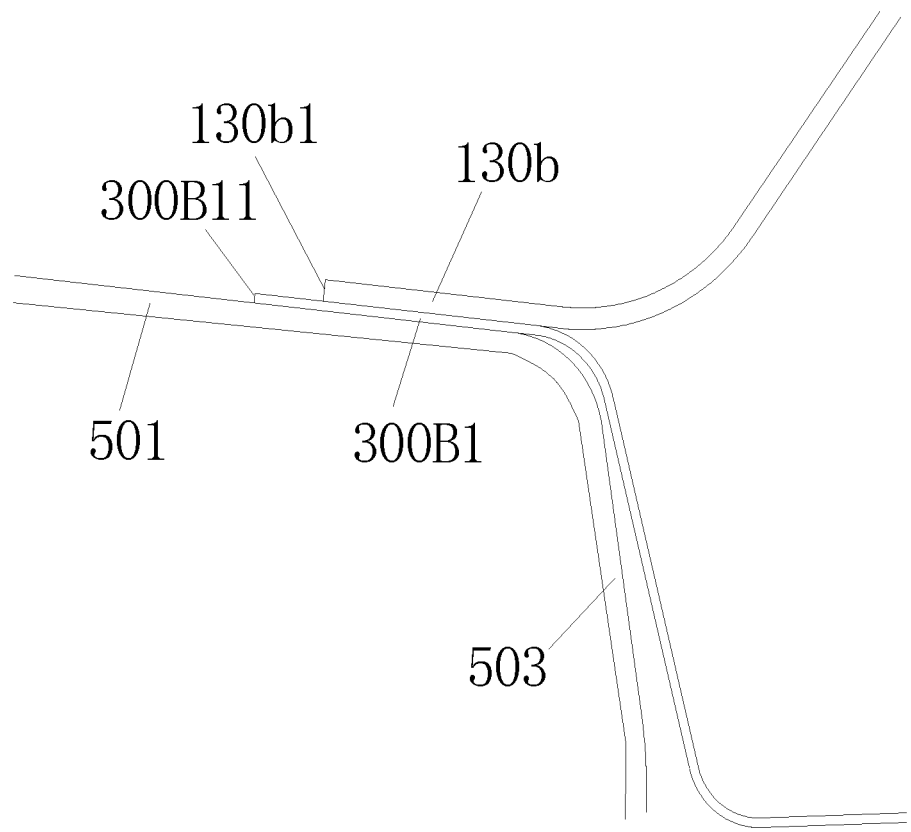
FIG. 14 is a partial enlarged view of FIG. 13.
Figure 15:
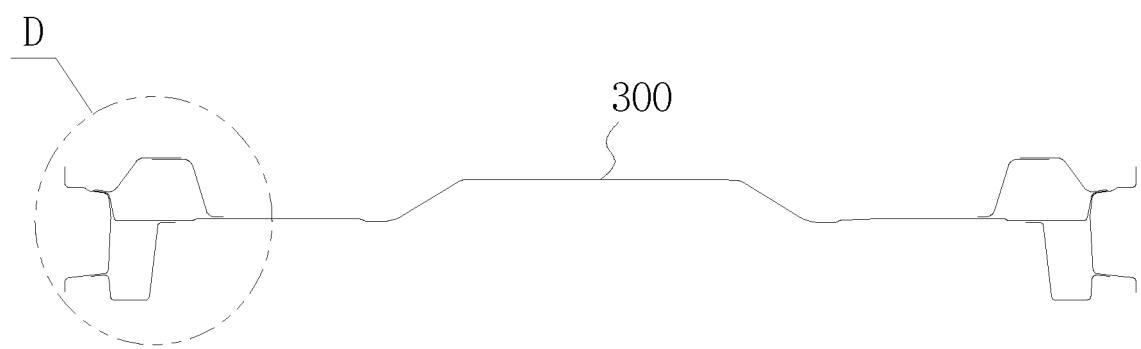
FIG. 15 is a B-B cross sectional view of FIG. 2.

To facilitate to apply a sealant between the first segment flanging 300B1 and the inner plate top wall 501 to prevent water from flowing into the interior of the vehicle, in an implementation, as shown in FIG. 14, an outer edge 300B11 of the first segment flanging 300B1 may protrude out of an outer edge 130b1 of the outer side flanging 130b of the strengthening longitudinal beam 130.

In the present disclosure, the strengthening crossbeam and the strengthening longitudinal beam may be connected together in any proper manner.

Figure 10:
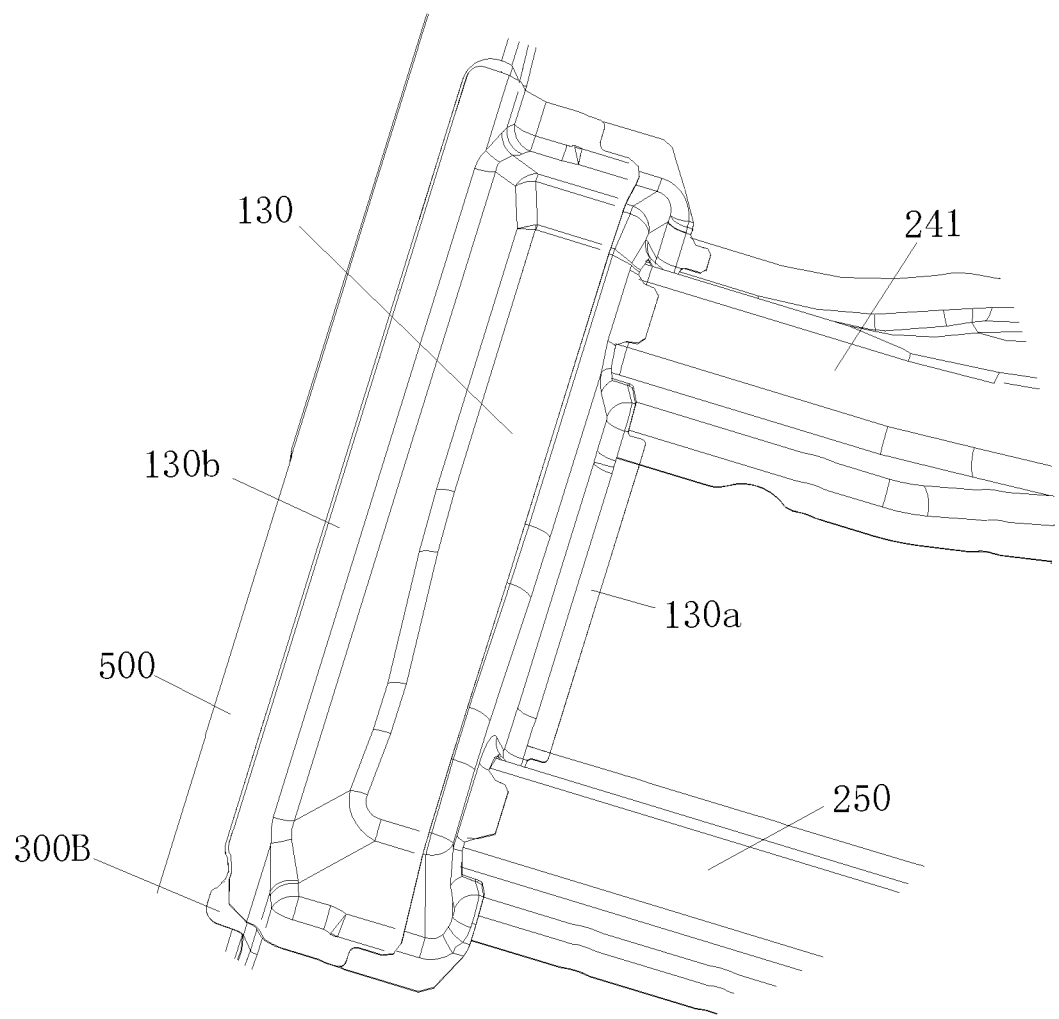
FIG. 10 is a schematic diagram of a connection manner of the strengthening longitudinal beam and the strengthening crossbeam of the vehicle body structure according to the first implementation of the present disclosure.

In an implementation, as shown in FIG. 6 and FIG. 10, two openings 130e are formed on the inner semi-body 130B, and end portions of the strengthening crossbeams 240 and 250 pass through the corresponding openings 130e to extend into the interior of the strengthening longitudinal beam 130 (that is, extending into a cavity formed by the strengthening longitudinal beam 130 and the floor panel 300). That is, the strengthening longitudinal beam 130 is disposed across the strengthening crossbeams 240 and 250. A shape of the opening 130e may be a shape matching with the cross section of the strengthening crossbeams 240 and 250, for example, may be a reversed "U" shape. An opening flanging 130f is formed at an edge of the opening 130e, and the opening flanging 130f is overlapped with the strengthening crossbeam, to connect the strengthening longitudinal beam and the strengthening crossbeam.

The end portion of each strengthening crossbeam may be directly connected to the sill inner plate 500, or may not be connected to the sill inner plate 500.

In this implementation, as shown in FIG. 13, a gap a may exist between the end portion of each strengthening crossbeam and the corresponding sill inner plate 500. For example, the gap may be 2 to 8 mm. In this case, when the side collision occurs, the sill inner plate 500 transfers the collision force to the connected strengthening longitudinal beam 130, the strengthening longitudinal beam 130 transfers the collision force to the strengthening crossbeams 240 and 250, the strengthening crossbeams 240 and 250 transfer the collision force to the strengthening longitudinal beam 130 on the other side, and the strengthening longitudinal beam 130 on the other side transfers the collision force to the connected sill inner plate 500. When the sill inner plate 500 is stressed and squeezed to deform and respectively come into contact with the end portions of the strengthening crossbeams 240 and 250, the sill inner plate 500 directly transfers some of the collision force to the strengthening crossbeams 240 and 250, and indirectly transfers the other part of the collision force to the strengthening crossbeams 240 and 250 through the strengthening longitudinal beam 130. The gap a between the end portions of the strengthening crossbeams 240 and 250 and the sill inner plates 500 can ensure that the sill inner plate 500 has a deformation buffer space, to absorb some of the collision energy.

As shown in FIG. 4 and FIG. 11, a central channel 300A protruding upward is formed on the floor panel 300. To facilitate to arrange the strengthening crossbeams 240 and 250 horizontally penetrating the floor panel 300, in this implementation, the central channel 300A may have a height lower than a common central channel. For example, the height of the central channel 300A may be less than 50 mm. The cross section of the central channel 300A is a U shape opening downward, and the central channel 300A includes a central channel top wall 300A1 and two central channel side walls 300A2.

In an implementation, the strengthening crossbeams 240 and 250 may be both located above the floor panel 300 and across the central channel 300A.

Figure 17:
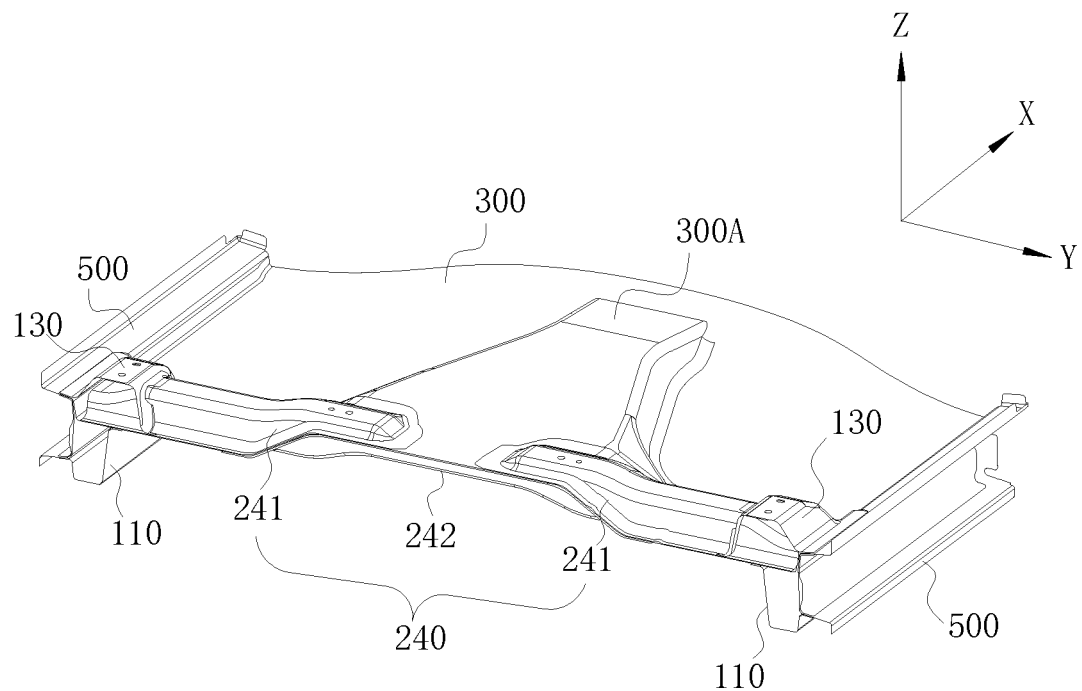
FIG. 17 is a three-dimensional view of a cross section of the vehicle body structure according to the first implementation of the present disclosure.

In this implementation, as shown in FIG. 4 and FIG. 17, the strengthening crossbeam 240 the front one of the two strengthening crossbeams, that is, the front strengthening crossbeam 240 may include two upper crossbeam segments 241 disposed at intervals and a lower crossbeam segment 242 connecting the two upper crossbeam segments 241. Each upper crossbeam segment 241 is located above the floor panel 300 and connected to one corresponding strengthening longitudinal beam 130, and the lower crossbeam segment 242 is located below the central channel 300A. The upper crossbeam segment 241, the central channel side wall 300A2, and the lower crossbeam segment 242 may be welded together by means of stitch welding.

Figure 7:
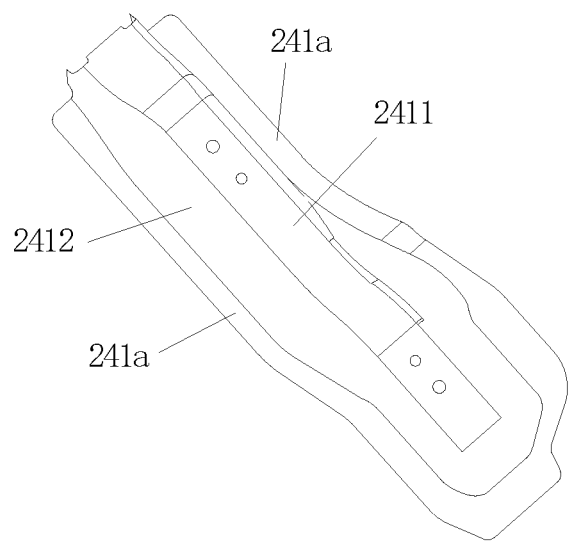
FIG. 7 is a three-dimensional view of an upper crossbeam segment of the vehicle body structure according to the first implementation of the present disclosure.

Specifically, as shown in FIG. 7, the upper crossbeam segment 241 may be formed as a groove-shaped structure opening downward, and include two upper crossbeam segment side walls 2412 that are disposed opposite to each other and an upper crossbeam segment top wall 2411 connecting the two upper crossbeam segment side walls 2412. An upper crossbeam segment side wall flanging 241a extending in the left-right direction is formed at a lower edge of the upper crossbeam segment side wall 2412, and the upper crossbeam segment side wall flanging 241a is overlapped with the upper surface of the floor panel 300.

Figure 8:
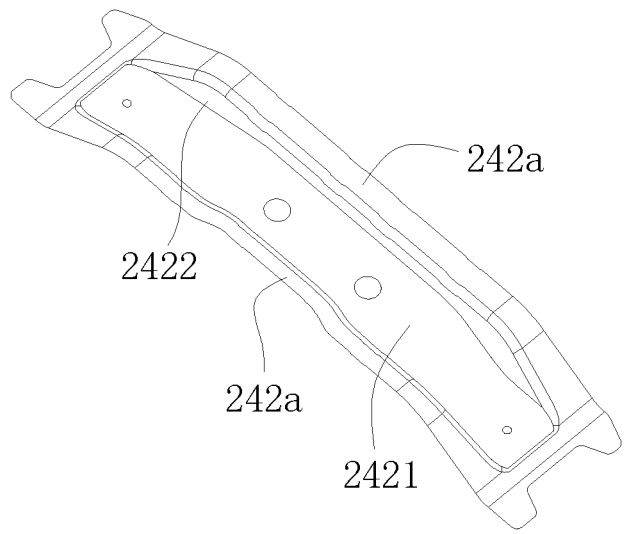
FIG. 8 is a three-dimensional view of a lower crossbeam segment of the vehicle body structure according to the first implementation of the present disclosure.

As shown in FIG. 8, the lower crossbeam segment 242 may be formed as a groove-shaped structure opening upward, and include two lower crossbeam segment side walls 2422 that are disposed opposite to each other and a lower crossbeam segment bottom wall 2421 connecting the two lower crossbeam segment side walls 2422. A lower crossbeam segment side wall flanging 242a extending in the left-right direction is formed at an upper edge of the lower crossbeam segment side wall 2422, and the lower crossbeam segment side wall flanging 242a is overlapped with the lower surface of the floor panel 300.

The upper crossbeam segment side wall flanging 241a, the central channel side wall 300A2, and the lower crossbeam segment side wall flanging 242a may be welded together at the central channel side wall 300A2 by means of stitch welding.

As shown in FIG. 17, one end of the upper crossbeam segment 241 far away from the sill inner plate 500 may extend to the central channel top wall 300A1, and the upper crossbeam segment side wall flanging 241a, the central channel top wall 300A1, and the lower crossbeam segment side wall flanging 242a may be welded together at the central channel top wall 300A1 by means of stitch welding.

Herein, during the side collision, the lower crossbeam segment 242 not only serves as a part of the strengthening crossbeam 240 to transfer the collision force, but also can strengthen the central channel 300A, to prevent the central channel 300A from shrinking from two sides to the middle during the side collision, thereby further reducing the horizontal deformation of the floor panel 300.

The rear one of the two strengthening crossbeams, that is, the rear strengthening crossbeam 250 may be located above the floor panel 300 and extend to pass through the central channel 300A. By reducing the height of the central channel 300A, height differences of parts of the strengthening crossbeam 250 can be reduced, and the strengthening crossbeam 250 can be ensured to have relatively good consistency and straightness, which is helpful to the transfer of the collision force.

Figure 9:
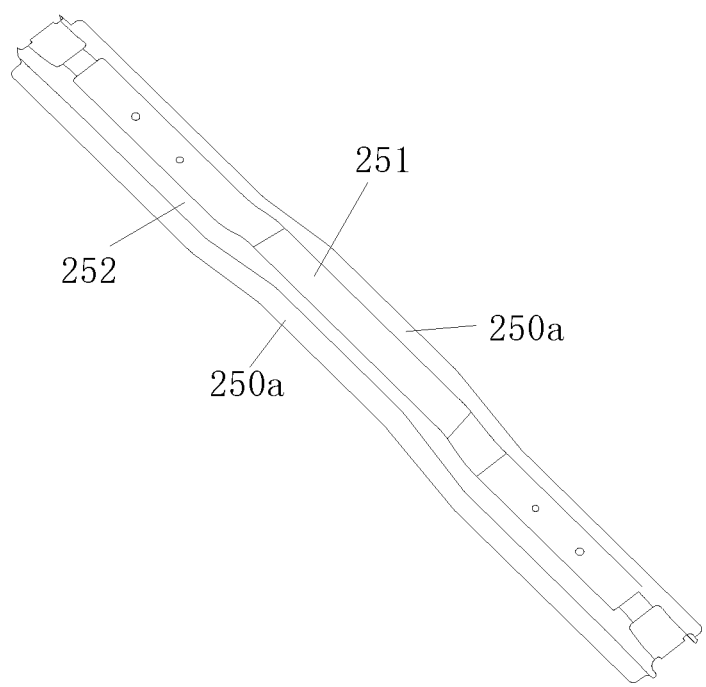
FIG. 9 is a three-dimensional view of a rear strengthening crossbeam of the vehicle body structure according to the first implementation of the present disclosure.

As shown in FIG. 9, the strengthening crossbeam 250 may be formed as a groove-shaped structure opening downward, and include two rear strengthening crossbeam side walls 252 that are disposed opposite to each other and a rear strengthening crossbeam top wall 251 connecting the two rear strengthening crossbeam side walls 252. A rear strengthening crossbeam side wall flanging 250a extending in the left-right direction is formed at a lower edge of the rear strengthening crossbeam side wall 252, and the rear strengthening crossbeam side wall flanging 250a is overlapped with the upper surface of the floor panel 300.

Similarly, as shown in FIG. 3 and FIG. 4, a central channel strengthening beam 430 may be disposed at a position below the central channel 300A and corresponding to the strengthening crossbeam 250, and two ends of the central channel strengthening beam 430 are welded together with the central channel side wall 300A2 and the strengthening crossbeam 250 by means of stitch welding. During the side collision, the central channel strengthening beam 430 not only can prevent the central channel 300A from shrinking from two sides to the middle, and reduce the horizontal deformation of the floor panel 300, but also can assist the strengthening crossbeam 250 in transferring some of the collision force, to avoid the deformation of the strengthening crossbeam 250 at a stress concentration region.

Figure 18:
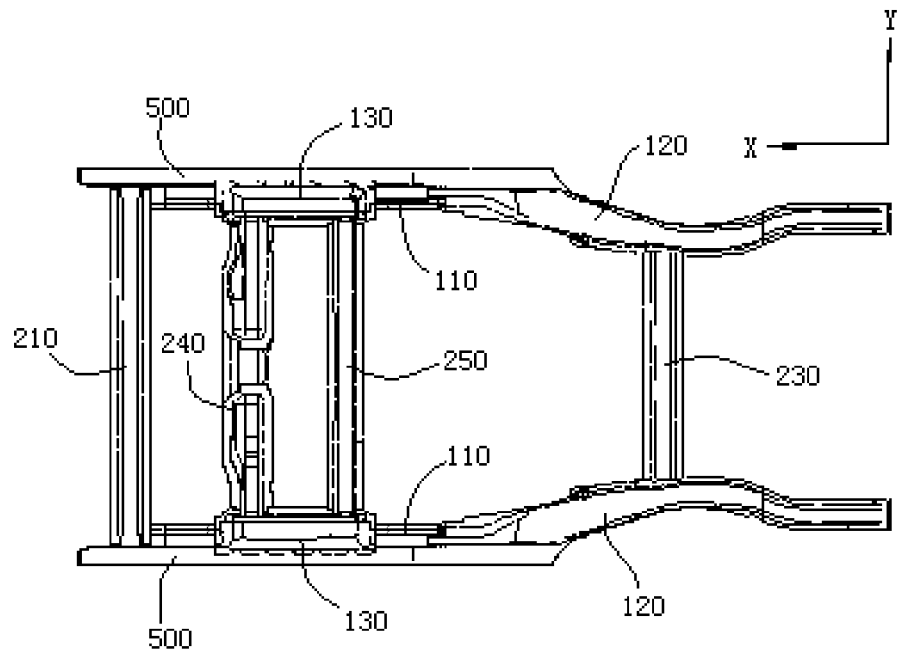
FIG. 18 is a top view of the vehicle body structure according to the first implementation of the present disclosure, where the floor panel is not shown.

In this implementation, as shown in FIG. 18, the vehicle body structure may further include a front crossbeam 210 and a rear-floor crossbeam 230 disposed at intervals in the front-rear direction and two rear longitudinal beams 120 disposed at intervals in the left-right direction, and a rear end of the rear longitudinal beam 120 may be connected to a rear anti-collision crossbeam. The front crossbeam 210 is located in front of the strengthening crossbeams 240 and 250 and connected to the lower surface of the floor panel 300, the rear-floor crossbeam 230 is located behind the strengthening crossbeams 240 and 250 and connected to the lower surface of the floor panel 300, a rear end of the sill inner plate 500 is connected to the rear longitudinal beam 120, and two ends of the rear-floor crossbeam 230 are respectively connected to the two rear longitudinal beams 120. In this case, for ease of description, the rear longitudinal beam 120 may be divided into a front part located in front of the rear-floor crossbeam 230 and a rear part located behind the rear-floor crossbeam 230.

Figure 19:
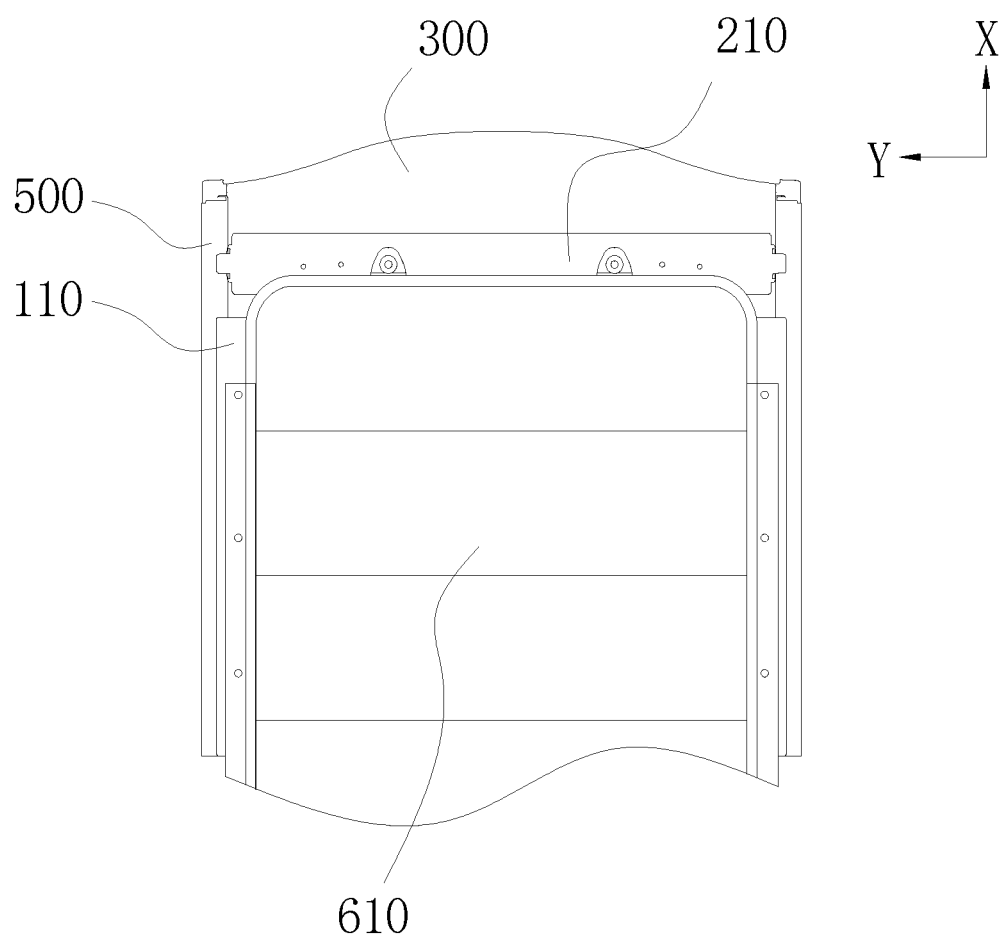
FIG. 19 is a partial bottom view of the vehicle body structure according to the first implementation of the present disclosure.

In this case, the front crossbeam 210, the two sill inner plates 500, front parts of the two rear longitudinal beams 120, and the rear-floor crossbeam 230 form a generally rectangular bearing frame. The bearing frame may be used for mounting and bearing vehicle elements, for example, a battery tray 610 (shown in FIG. 19) used for mounting and bearing of a battery pack.

When the bearing frame is used for mounting the battery tray 610, the front crossbeam 210 and the rear-floor crossbeam 230 may be sequentially referred to as a battery pack front mounting crossbeam and a battery pack rear mounting crossbeam.

Figure 20:
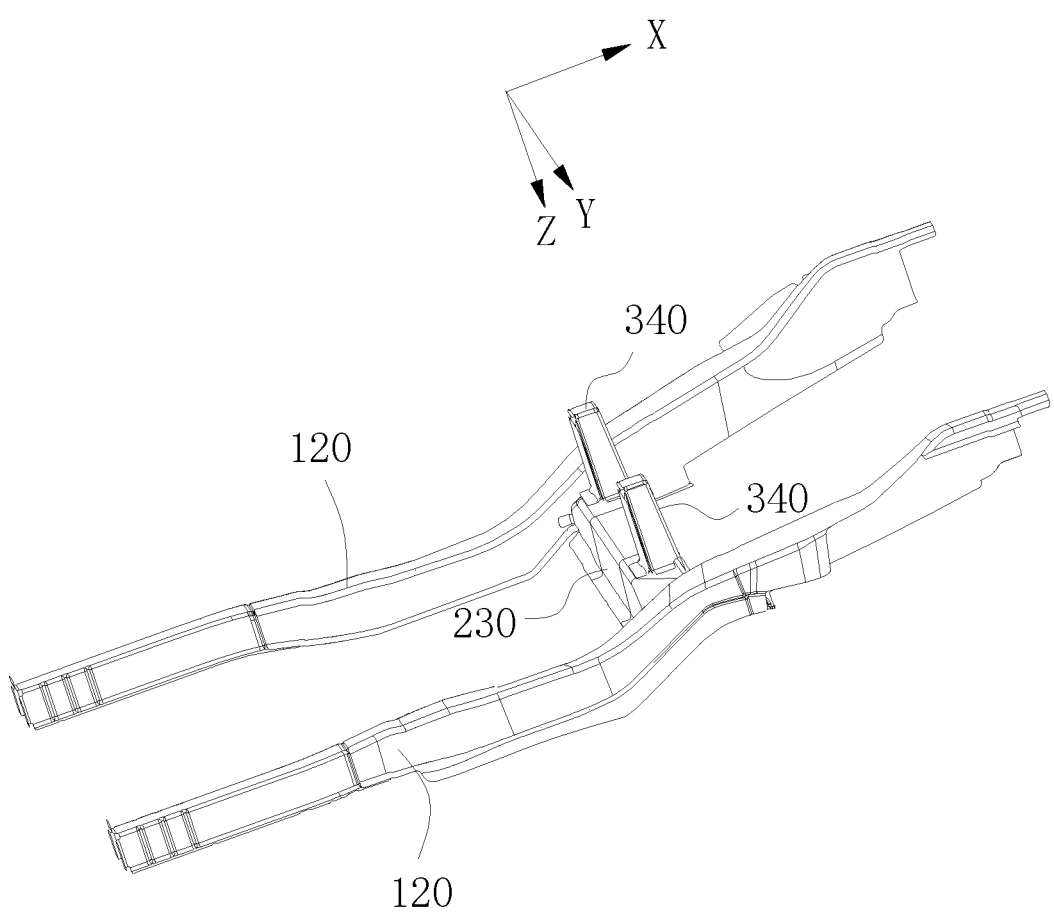
FIG. 20 is a three-dimensional view of a rear part of the vehicle body structure according to the first implementation of the present disclosure.

Because the rear longitudinal beam 120 is usually an arch bending upward, the position of the rear-floor crossbeam 230 is usually higher than the position of the front crossbeam 210. In this case, to ensure the horizontal arrangement of the battery tray 610, as shown in FIG. 20, two battery tray mounting supports 340 extending downward may be disposed on the rear-floor crossbeam 230, the two battery tray mounting supports 340 are disposed at intervals in the left-right direction, a rear end of the battery tray 610 is mounted on the front crossbeam 210, and a rear end of the battery tray 610 is mounted on the battery tray mounting support 340. A battery tray fastening hole may be opened on the front crossbeam 210 and the battery tray mounting support 340, so that the front end and the rear end of the battery tray 610 bearing the battery pack may be respectively mounted on the front crossbeam 210 and the battery tray mounting support 340 by using fasteners.

In this implementation, as shown in FIG. 3, FIG. 4, FIG. 13, FIG. 16, FIG. 17, FIG. 18, and FIG. 20, the vehicle body structure may further include two floor longitudinal beams 110 disposed at intervals in the left-right direction, and the floor longitudinal beam 110 is connected to the lower surface of the floor panel 300. A front end of each floor longitudinal beam 110 is connected to the front crossbeam 210, and a rear end of each floor longitudinal beam 110 is connected to one corresponding rear longitudinal beam 120. In this way, a vehicle body beam is respectively mounted on the floor panel 300 in the front-rear direction and the left-right direction of the vehicle, to provide a function of strengthening the floor panel 300, to avoid an excessive deformation of the floor panel 300 in the collision (including a front collision, a rear collision, and a side collision).

In this implementation, the battery tray fastening hole may be opened on the floor longitudinal beam 110, and a left side and a right side of the battery tray 610 may be respectively mounted on the floor longitudinal beam 110. In this case, the floor longitudinal beam 110 may be referred to as a battery pack mounting longitudinal beam.

An inner side and an outer side of the floor longitudinal beam 110 may be both connected to the lower surface of the floor panel 300. In this implementation, as shown in FIG. 16 and FIG. 17, the outer side of the floor longitudinal beam 110 is connected to one corresponding sill inner plate 500, and the inner side of the floor longitudinal beam is connected to the floor panel 300. By connecting the floor longitudinal beam 110 to the sill inner plate 500, the sill inner plate 500 can be further strengthened, and the flipping deformation of the sill inner plate 500 during the side collision is reduced. In addition, when the floor longitudinal beam 110 is used as the battery pack mounting longitudinal beam, a spacing between the two floor longitudinal beams 110 may be increased as much as possible in this connection manner, thereby ensuring that a larger space exists below the floor panel 300 for disposing more batteries, to increase the endurance mileage of the vehicle. When the strengthening longitudinal beam 130 is disposed below the floor panel 300, the strengthening longitudinal beam 130 may be integrally formed with the floor longitudinal beam 110. That is, the strengthening crossbeams 240 and 250 may be connected to the floor longitudinal beam 110.

In an alternative implementation, the battery tray fastening hole may be opened on the sill inner plate 500, to respectively mount the left side and the right side of the battery tray 610 on the two sill inner plates 500. In this way, the floor longitudinal beam 110 does not need to be disposed.

In another alternative implementation, the battery tray fastening hole may be respectively opened on the floor longitudinal beam 110 and the sill inner plate 500, and the battery tray 610 is mounted on both the floor longitudinal beam 110 and the sill inner plate 500 simultaneously. In this case, the floor longitudinal beam 110 may be referred to as a battery pack mounting longitudinal beam.

In this implementation, two ends of the rear-floor crossbeam 230 are respectively connected to the two rear longitudinal beams 120. Especially when the rear-floor crossbeam 230 is used as the rear mounting crossbeam of the battery pack, a gap between the front crossbeam 210 and the rear-floor crossbeam 230 may be increased in this manner, thereby ensuring that a larger space exists below the floor panel 300 for disposing more batteries, to increase the endurance mileage of the vehicle.

In a possible implementation, the two ends of the rear-floor crossbeam 230 may be respectively connected to the two floor longitudinal beams 110 or the two sill inner plates 500. In this case, the bearing frame may not include the two rear longitudinal beams 120.

The battery pack may be mounted on the bearing frame in a whole form, or may be mounted on the bearing frame in a separated form. That is, the battery tray 610 may be one, or may include a plurality of sub trays disposed separately.

Figure 26:
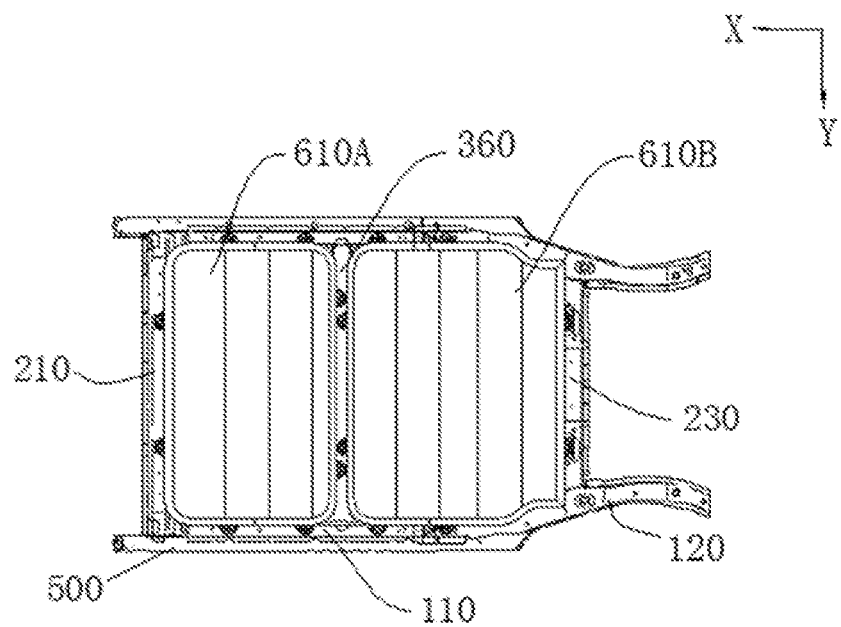
FIG. 26 is a bottom view of a vehicle body structure according to another implementation of the present disclosure.

When the battery pack is a plurality of battery packs disposed separately, as shown in FIG. 26, one or more battery pack middle mounting crossbeams 360 may be disposed between the front crossbeam 210 and the rear-floor crossbeam 230 to separate the bearing frame 700 into a plurality of sub frames. In this way, the battery tray (that is, each sub tray) of each battery pack may be mounted on one corresponding sub frame. The battery tray fastening hole may be opened on the battery pack middle mounting crossbeam 360. The battery pack middle mounting crossbeam 360 may be disposed on the lower surface of the floor panel 300, or may be disposed on the upper surface of the floor panel 300. When the battery pack middle mounting crossbeam 360 is disposed on the upper surface of the floor panel 300, the battery pack fastening hole may be opened at one corresponding position on the floor panel 300, so that the fastener can pass through the floor panel 300 to connect to the battery pack middle mounting crossbeam 360.

Herein, the battery pack middle mounting crossbeam 360 may be a crossbeam additionally disposed for mounting the battery pack, or may be an inherent crossbeam (for example, the front seat mounting crossbeam) of the vehicle body structure.

In an implementation, as shown in FIG. 26, the battery tray 610 includes a first sub tray 610A and a second sub tray 610B disposed separately, and one battery pack middle mounting crossbeam 360 is disposed between the front crossbeam 210 and the rear-floor crossbeam 230. The first sub tray 610A is respectively connected to the front crossbeam 210, the floor longitudinal beam 110, and the battery pack middle mounting crossbeam 360, and the second sub tray 610B is respectively connected to the battery pack middle mounting crossbeam 360, the floor longitudinal beam 110, and the rear-floor crossbeam 230.

Figure 21:
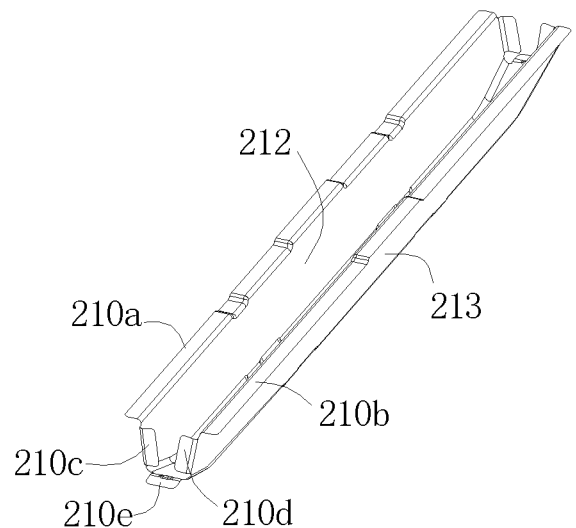
FIG. 21 is a three-dimensional view of a front crossbeam of the vehicle body structure according to the first implementation of the present disclosure.

In this implementation, referring to FIG. 21, the front crossbeam 210 may be formed as a groove-shaped structure opening upward, and include a front crossbeam bottom wall 211, and a front crossbeam front side wall 212 and a front crossbeam rear side wall 213 that are disposed opposite to each other. A front crossbeam front side wall flanging 210a extending in the left-right direction is formed at an upper edge of the front crossbeam front side wall 212, a front crossbeam rear side wall flanging 210b extending in the left-right direction is formed at an upper edge of the front crossbeam rear side wall 213, and the front crossbeam 210 is connected to the lower surface of the floor panel 300 by using the front crossbeam front side wall flanging 210a and the front crossbeam rear side wall flanging 210b.

The front crossbeam 210 and the floor panel 300 encircle a cavity whose cross section is generally rectangular or trapezoidal, to improve the collision resistance of the vehicle body structure and help reduce the collision deformation of the floor panel 300. A strengthening structure (for example, a welded sheet metal) may be disposed or CBS (composite reinforcement materials) may be filled in the cavity encircled by the front crossbeam 210 and the floor panel 300, to further increase the capability of the front crossbeam 210 to bear the collision, and decrease deformations of the front crossbeam 210 in the collision.

As shown in FIG. 21, an end portion flanging 210c of the front crossbeam front side wall may be formed at an end portion of the front crossbeam front side wall 212, an end portion flanging 210d of the front crossbeam rear side wall may be formed at an end portion of the front crossbeam rear side wall 213, and an end portion of the front crossbeam bottom wall 211 may extend outward to form an overlap edge 210e of the front crossbeam bottom wall, so that the front crossbeam 210 can be respectively overlapped with the floor longitudinal beam 110 or the sill inner plate 500 by using the end portion flanging 210c of the front crossbeam front side wall, the end portion flanging 210d of the front crossbeam rear side wall, and the overlap edge 210e of the front crossbeam bottom wall.

In this implementation, as shown in FIG. 16, the floor longitudinal beam 110 may be formed as a groove-shaped structure opening upward, and include a floor longitudinal beam inner side wall 112, a floor longitudinal beam outer side wall 113, and a floor longitudinal beam bottom wall 111 respectively connected to the floor longitudinal beam inner side wall 112 and the floor longitudinal beam outer side wall 113. A floor longitudinal beam inner side flanging 110a extending in the front-rear direction is formed at an upper edge of the floor longitudinal beam inner side wall 112, and a floor longitudinal beam outer side flanging 110b extending in the front-rear direction is formed at an upper edge of the floor longitudinal beam outer side wall 113. The floor longitudinal beam inner side flanging 110a is overlapped with the lower surface of the floor panel 300, the floor longitudinal beam outer side flanging 110b is overlapped with the inner plate bottom wall 502 of the sill inner plate 500, and the position of the floor longitudinal beam outer side flanging 110b may be lower than the position of the floor longitudinal beam inner side flanging 110a.

When the floor longitudinal beam 110 is used as the battery pack mounting longitudinal beam, to prevent the battery in the battery tray 610 from being squeezed during the side collision, in this implementation, as shown in FIG. 13, the end portions of the strengthening crossbeams 240 and 250 may extend beyond the floor longitudinal beam inner side wall 112 in the horizontal direction, thereby ensuring that the two ends of the strengthening crossbeams 240 and 250 both extend beyond the left side and the right side of the battery.

Figure 22:
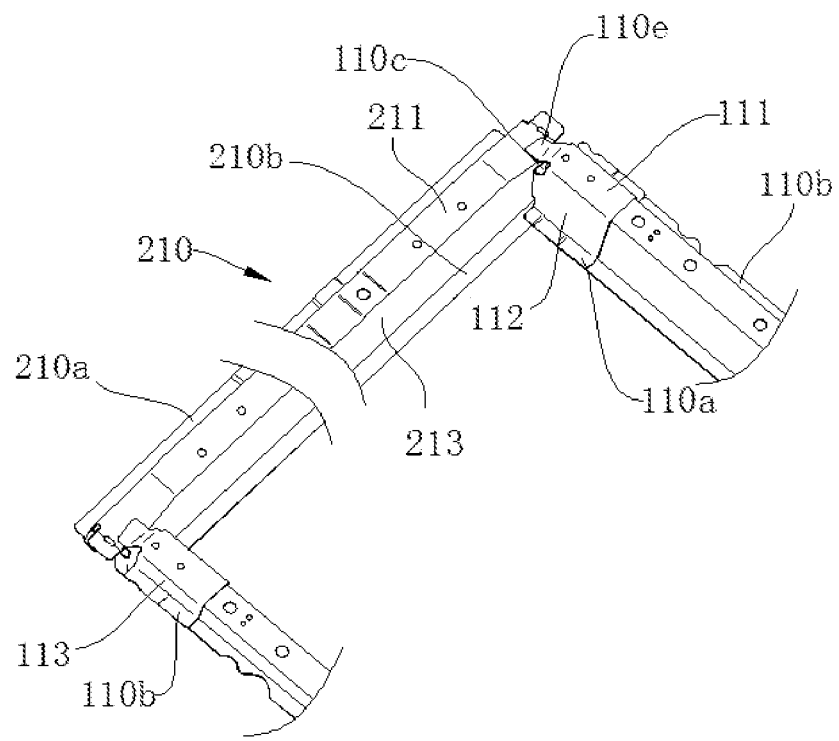
FIG. 22 is a schematic diagram of a connection manner of the front crossbeam and a floor longitudinal beam of the vehicle body structure according to the first implementation of the present disclosure.
Figure 23:
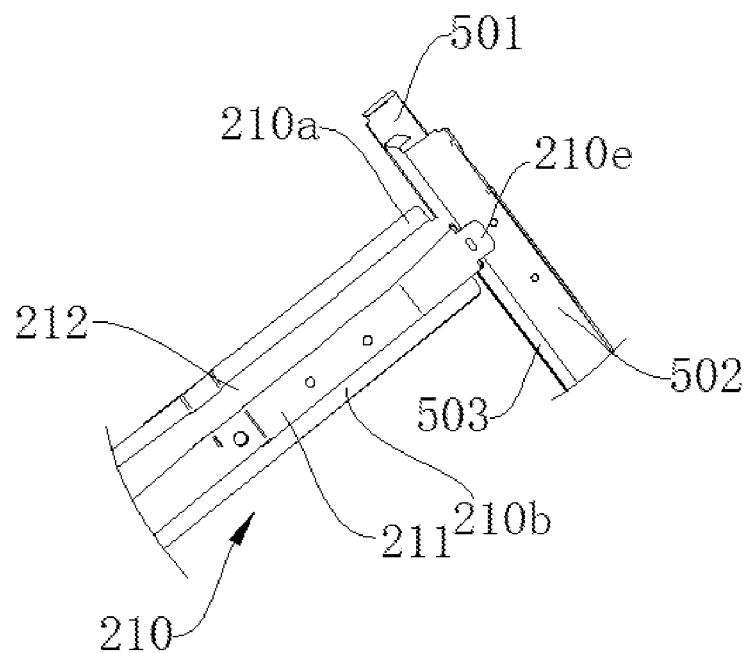
FIG. 23 and FIG. 24 are schematic diagrams of connection manners of the front crossbeam and a sill inner plate of the vehicle body structure according to the first implementation of the present disclosure.
Figure 24:
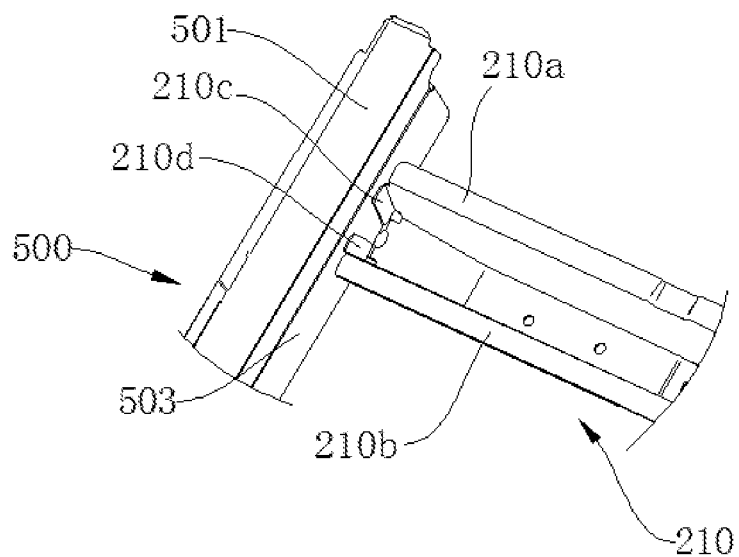

As a first possible implementation of the connection manner of the front crossbeam 210, the floor longitudinal beam 110, and the sill inner plate 500, as shown in FIG. 22 to FIG. 24, two ends of the front crossbeam 210 are respectively connected to the sill inner plate 500, and the front end of the floor longitudinal beam 110 is connected to the front crossbeam 210.

Specifically, the end portion flanging 210c of the front crossbeam front side wall is formed at the end portion of the front crossbeam front side wall 212 of the front crossbeam 210, the end portion flanging 210d of front crossbeam the rear side wall is formed at the end portion of the front crossbeam rear side wall 213, and the end portion of the front crossbeam bottom wall 211 may extend outward to form the overlap edge 210e of the front crossbeam bottom wall. The end portion flanging 210c of the front crossbeam front side wall is overlapped with the inner plate side wall 503 of the sill inner plate 500, the end portion flanging 210d of the front crossbeam rear side wall is overlapped with the inner plate side wall 503 of the sill inner plate 500, and the overlap edge 210e of the front crossbeam bottom wall is overlapped with the inner plate bottom wall 502 of the sill inner plate 500, to ensure that the connection between the front crossbeam 210 and the sill inner plate 500 is not easy to fail, thereby better dispersing the collision impact, and avoiding a large deformation of the vehicle body structure.

A front end flanging 110c of floor longitudinal beam inner side wall is formed at a front end of the floor longitudinal beam inner side wall 112, and a front end of the floor longitudinal beam bottom wall 111 extends forward to form an overlap edge 110e of the floor longitudinal beam bottom wall. The floor longitudinal beam inner side flanging 110a is overlapped with the front crossbeam rear side wall flanging 210b of the front crossbeam 210, the front end flanging 110c of the floor longitudinal beam inner wall is overlapped with the front crossbeam rear side wall 213 of the front crossbeam 210, and the overlap edge 110e of the floor longitudinal beam bottom wall is overlapped with the front crossbeam bottom wall 211 of the front crossbeam 210.

In this connection manner, any two of the front crossbeam 210, the floor longitudinal beam 110, and the sill inner plate 500 have a connection relationship. Therefore, when a collision (for example, a front collision) occurs to the vehicle, the collision impact suffered by a front longitudinal beam 100 is transferred to the front crossbeam 210 and is transferred to the floor longitudinal beam 110 and the sill inner plate 500 by the front crossbeam 210, and the floor longitudinal beam 110 is connected to the sill inner plate 500. This connection manner enables the collision impact to be dispersed at the connection positions of the three structures in a relatively uniform manner and improves the collision resistance of the connection positions.

An advantage of this connection manner further lies in that when a front collision occurs to the vehicle, the end portion of the floor longitudinal beam 110 can abut against the front crossbeam 210 to prevent the front crossbeam 210 from moving backward and squeezing other elements of the vehicle body structure. For example, when the front crossbeam 210 is used as the battery pack front mounting crossbeam, this connection manner can protect the battery pack located behind the battery pack front mounting crossbeam. Similarly, when a side collision occurs to the vehicle, the front crossbeam 210 can abut against the sill inner plate 500 to prevent the sill inner plate 500 from squeezing inward to drive the floor longitudinal beam 110 to move toward the inner side of the vehicle body structure, to protect other elements on the inner side of the floor longitudinal beam 110. For example, when the floor longitudinal beam 110 is used as the battery pack mounting longitudinal beam, this connection manner can protect the battery pack on the inner side of the battery pack mounting longitudinal beam, thereby avoiding a potential outbreak of a fire of the battery pack caused by squeezing and deformation, and improving the collision safety performance of the vehicle.

Figure 25:
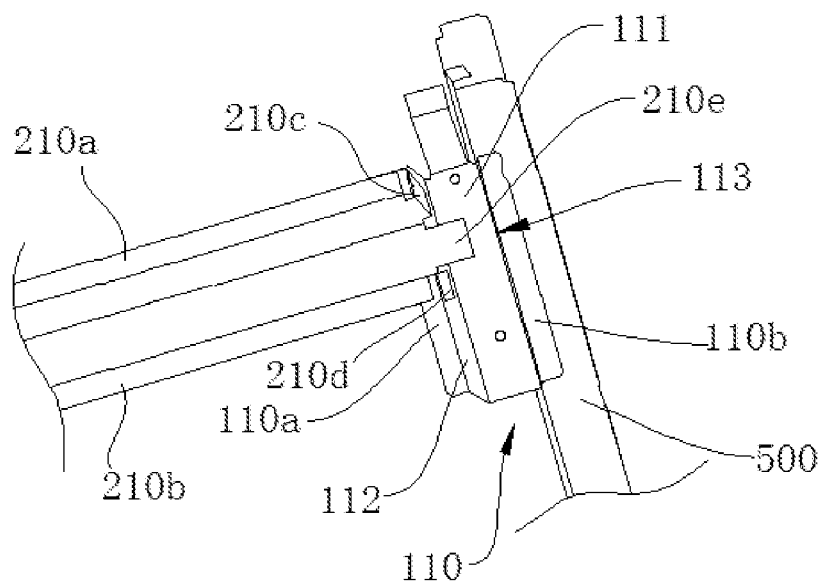
FIG. 25 is a schematic diagram of a connection manner of a front crossbeam, a floor longitudinal beam, and a sill inner plate of a vehicle body structure according to another implementation of the present disclosure.

As a second possible implementation of the connection manner of the front crossbeam 210, the floor longitudinal beam 110, and the sill inner plate 500, as shown in FIG. 25, two ends of the front crossbeam 210 are respectively connected to the two floor longitudinal beams 110, and the sill inner plate 500 is connected to the outer side of the floor longitudinal beam 110 and is disposed at intervals with the front crossbeam 210. That is, the front crossbeam 210 and the sill inner plate 500 are respectively connected to two sides of the floor longitudinal beam 110.

Specifically, the front crossbeam front side wall flanging 210a is overlapped with the floor longitudinal beam inner side flanging 110a, the front crossbeam rear side wall flanging 210b is overlapped with the floor longitudinal beam inner side flanging 110a, the end portion flanging 210c of the front crossbeam front side wall is overlapped with the floor longitudinal beam inner side wall 112, the end portion flanging 210d of the front crossbeam rear side wall is overlapped with the floor longitudinal beam inner side wall 112, the overlap edge 210e of front crossbeam bottom wall is overlapped with the floor longitudinal beam bottom wall 111, and the floor longitudinal beam outer side flanging 110b is overlapped with the inner plate bottom wall 502.

In this connection manner, when the front collision occurs to the vehicle, the collision impact suffered by the front longitudinal beam 100 is transferred to the front crossbeam 210 and sequentially transferred to the floor longitudinal beam 110 and the sill inner plate 500.

Figure 27:
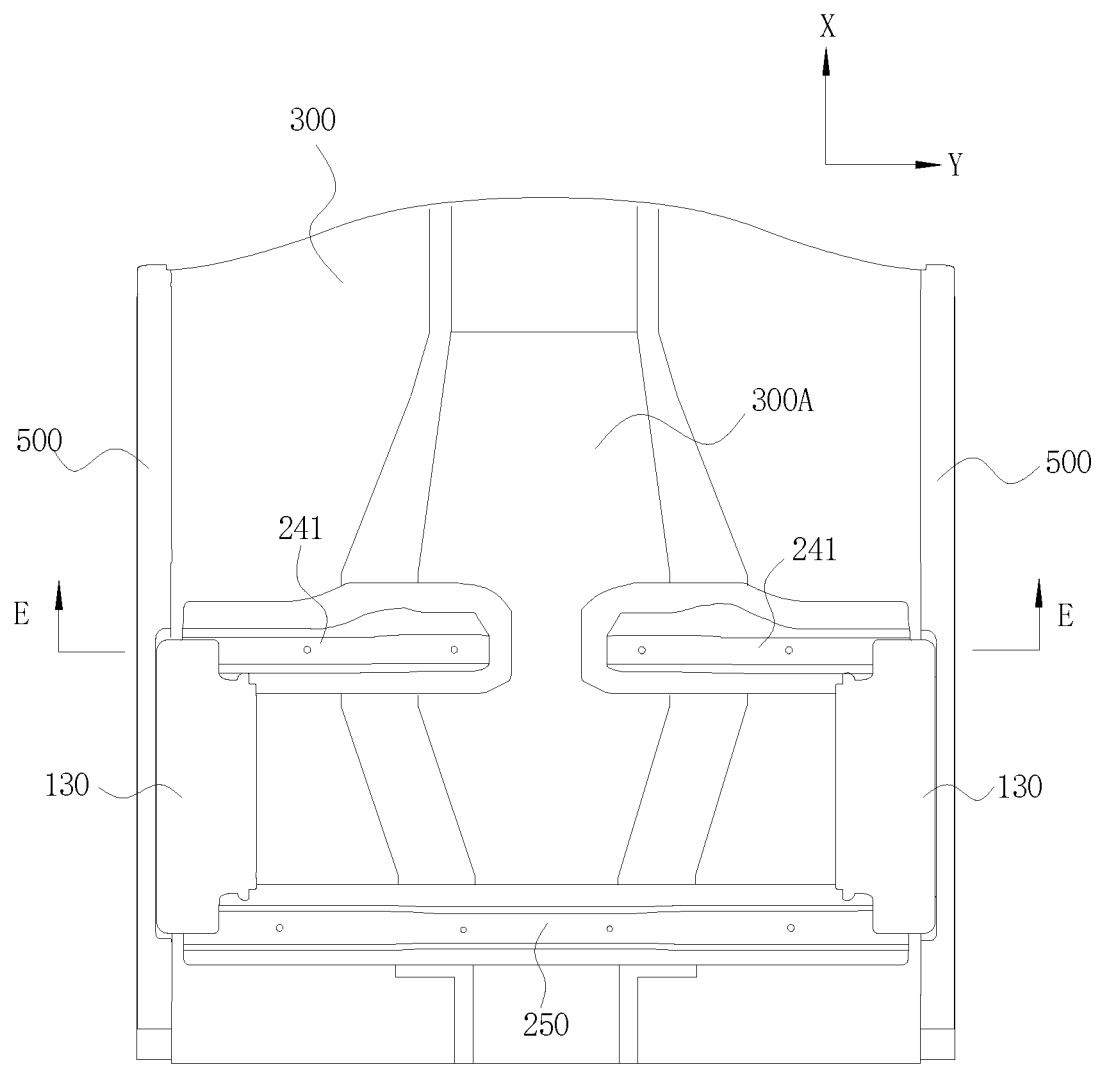
FIG. 27 is a top view of a vehicle body structure according to a second implementation of the present disclosure.
Figure 28:
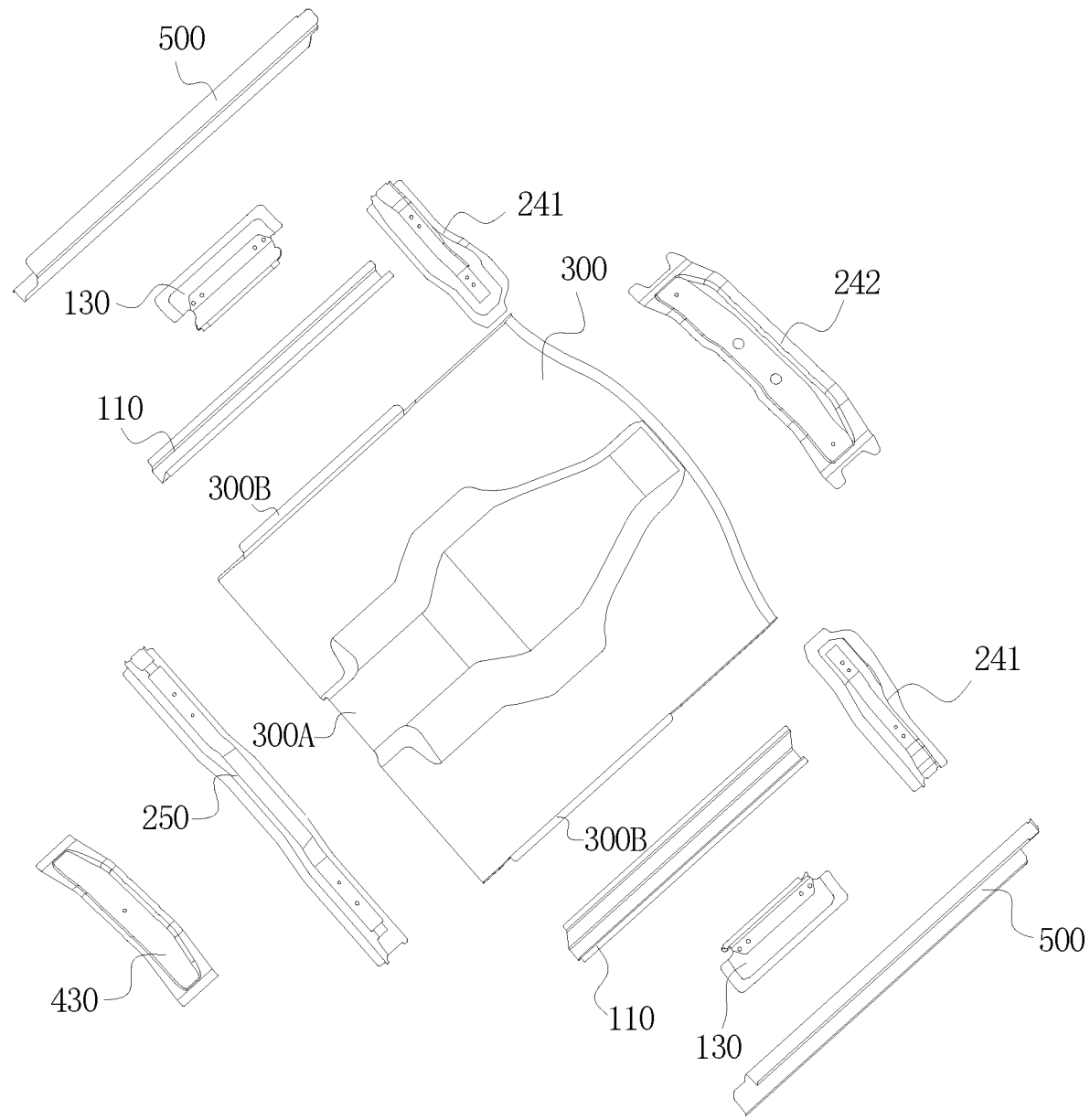
FIG. 28 is an exploded view of the vehicle body structure according to the second implementation of the present disclosure.

FIG. 27 is a top view of a vehicle body structure according to a second implementation of the present disclosure. FIG. 28 is an exploded view of the vehicle body structure according to the second implementation of the present disclosure. A difference between the second implementation and the first implementation of the present disclosure includes: the connection manner between the strengthening crossbeam and the strengthening longitudinal beam. As shown in FIG. 27 and FIG. 28, in the second implementation, the strengthening longitudinal beam 130 is located between the strengthening crossbeams 240 and 250, and two ends of the strengthening longitudinal beam 130 are respectively connected to the strengthening crossbeams 240 and 250.

Figure 29:
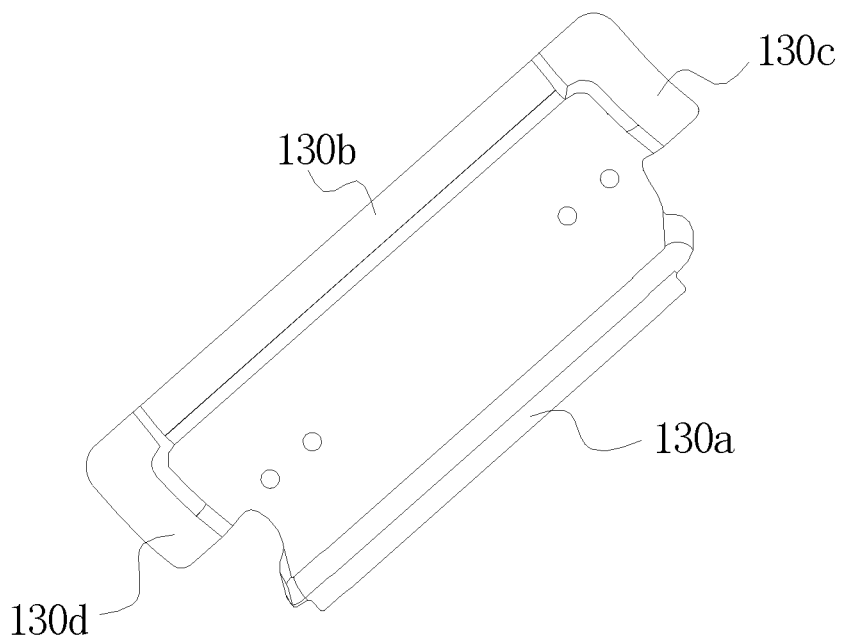
FIG. 29 is a three-dimensional view of a strengthening longitudinal beam of the vehicle body structure according to the first implementation of the present disclosure.
Figure 30:
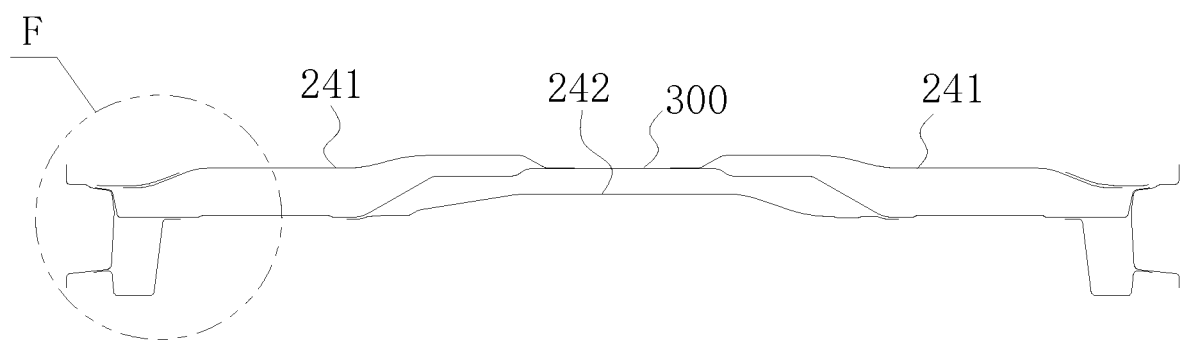
FIG. 30 is an E-E cross sectional view of FIG. 27.
Figure 31:
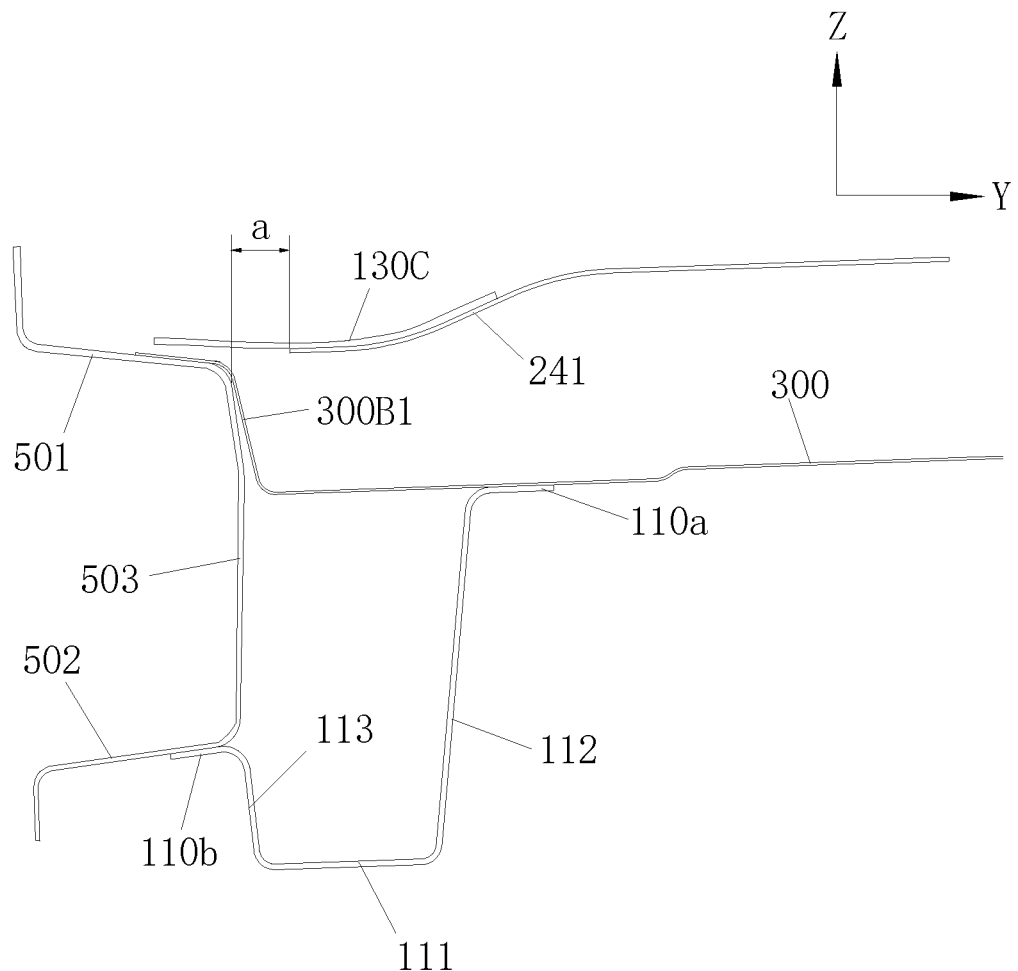
FIG. 31 is an enlarged view of a part F in FIG. 30.

Specifically, in this implementation, as shown in FIG. 29 and FIG. 21, the two ends of the strengthening longitudinal beam 130 may respectively have a strengthening longitudinal beam front end flanging 130c and a strengthening longitudinal beam rear end flanging 130d, the strengthening longitudinal beam front end flanging 130c is overlapped with the strengthening crossbeam 240, and the strengthening longitudinal beam rear end flanging 130d is overlapped with the strengthening crossbeam 250.

Figure 32:
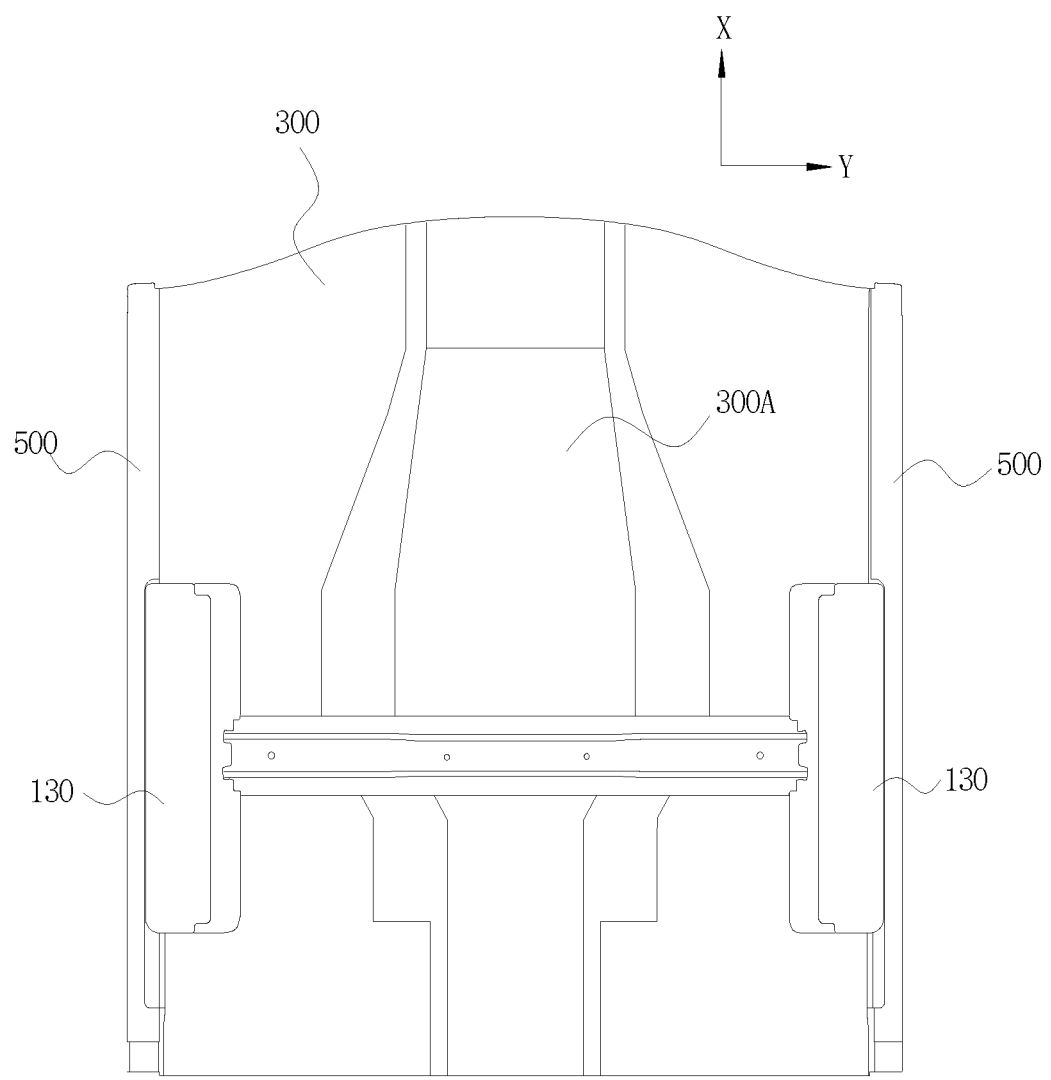
FIG. 32 is a top view of a vehicle body structure according to a third implementation of the present disclosure.

FIG. 32 is a top view of a vehicle body structure according to a third implementation of the present disclosure. A difference between the third implementation and the first implementation of the present disclosure includes: the quantity of the strengthening crossbeams. As shown in FIG. 32, in the third implementation, the two strengthening longitudinal beams 130 are connected by using only one strengthening crossbeam 240. The connection manner between the strengthening crossbeam and the strengthening longitudinal beam may be the same as that in the first implementation, and details are not described herein again.

Figure 33:
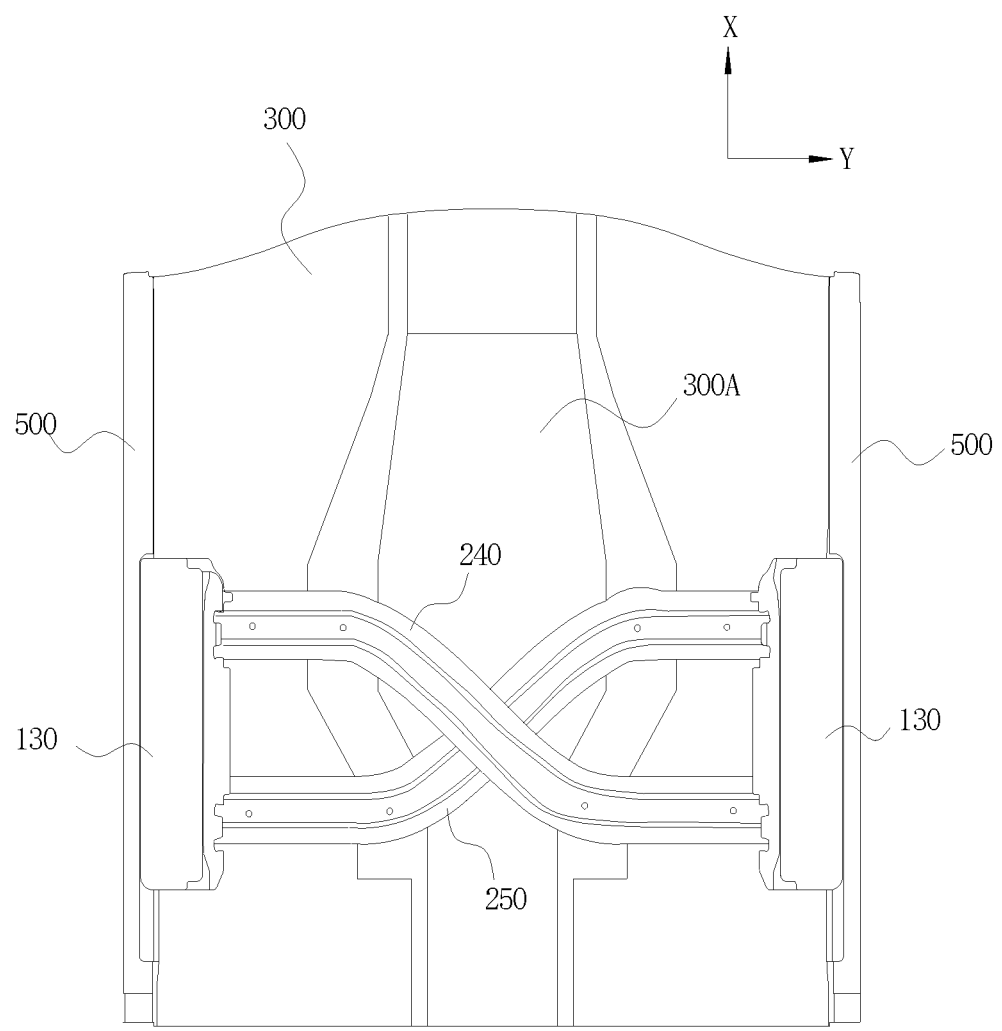
FIG. 33 is a top view of a vehicle body structure according to a fourth implementation of the present disclosure.

FIG. 33 is a top view of a vehicle body structure according to a fourth implementation of the present disclosure. A difference between the fourth implementation and the first implementation of the present disclosure includes: the disposing manner of the two strengthening crossbeams. As shown in FIG. 33, in the fourth implementation, the two strengthening longitudinal beams 130 are connected by using two crossed strengthening crossbeams 240 and 250. The connection manner between the strengthening crossbeam and the strengthening longitudinal beam may be the same as that in the first implementation, and details are not described herein again. As shown in FIG. 33, each strengthening crossbeam may be divided into three segments, the two segments on two ends may extend in the left-right direction and be connected to the strengthening longitudinal beam 130, and the middle segment may be disposed on the central channel 300A and extend obliquely.

Figure 34:
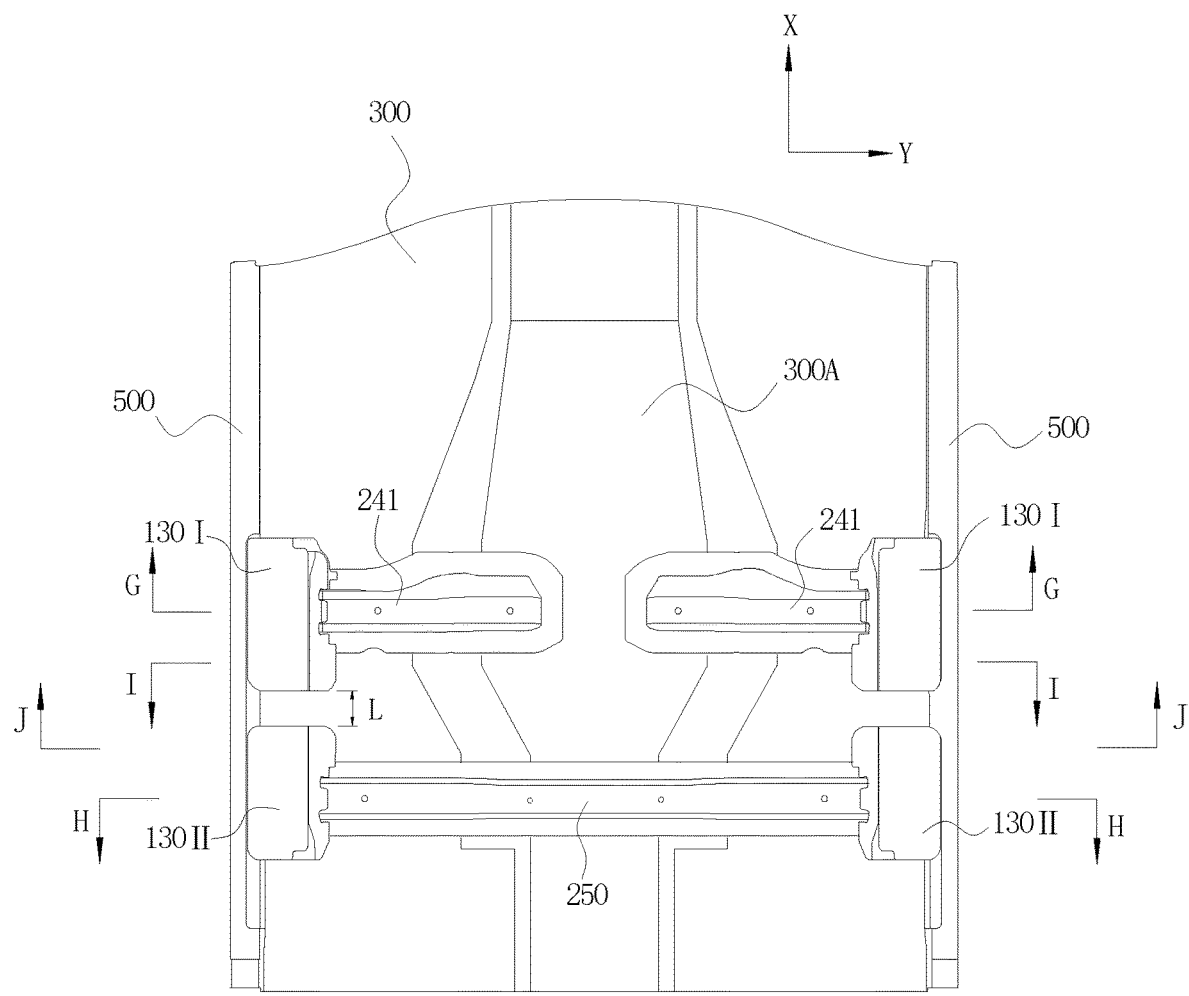
FIG. 34 is a top view of a vehicle body structure according to a fifth implementation of the present disclosure.
Figure 35:
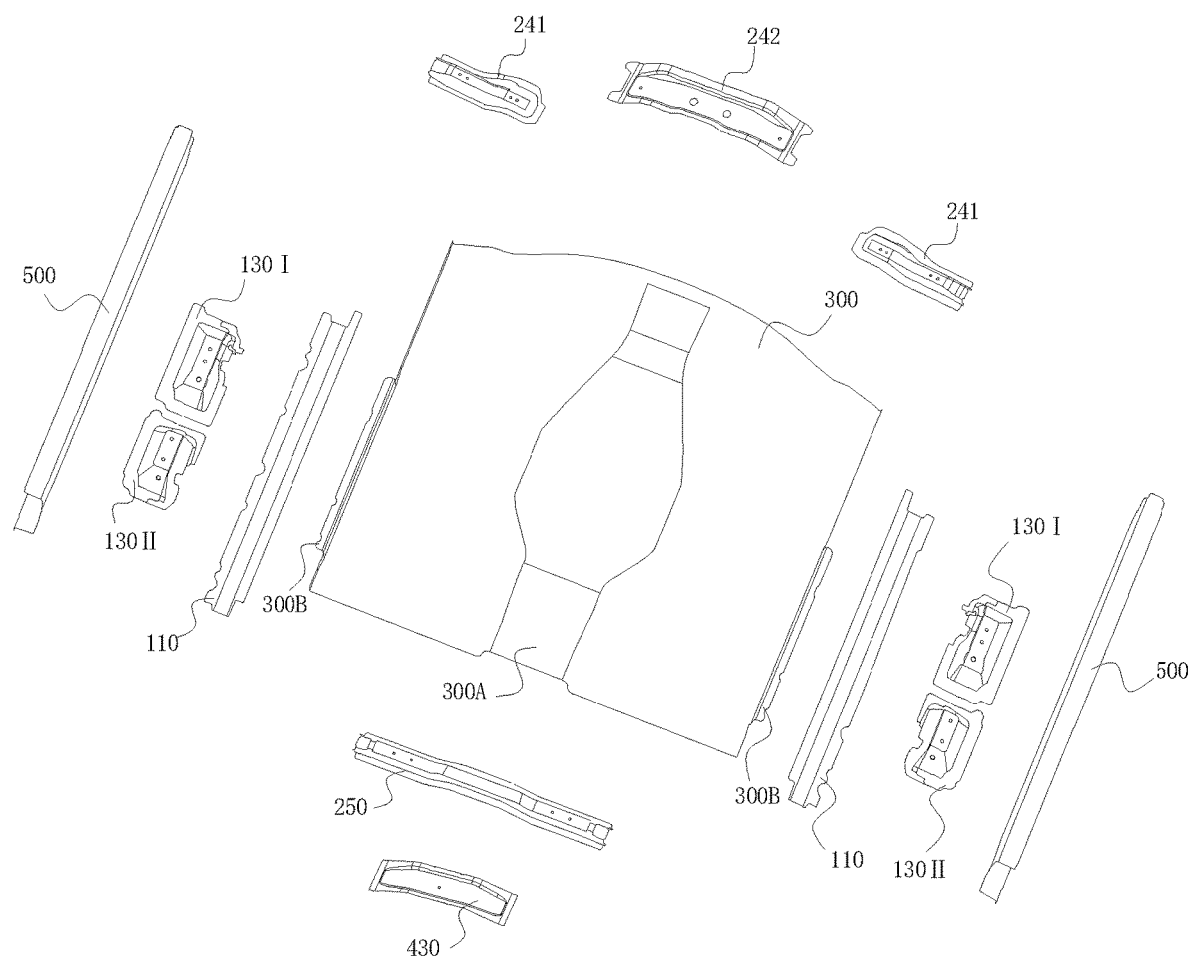
FIG. 35 is an exploded view of the vehicle body structure according to the fifth implementation of the present disclosure.
Figure 36:
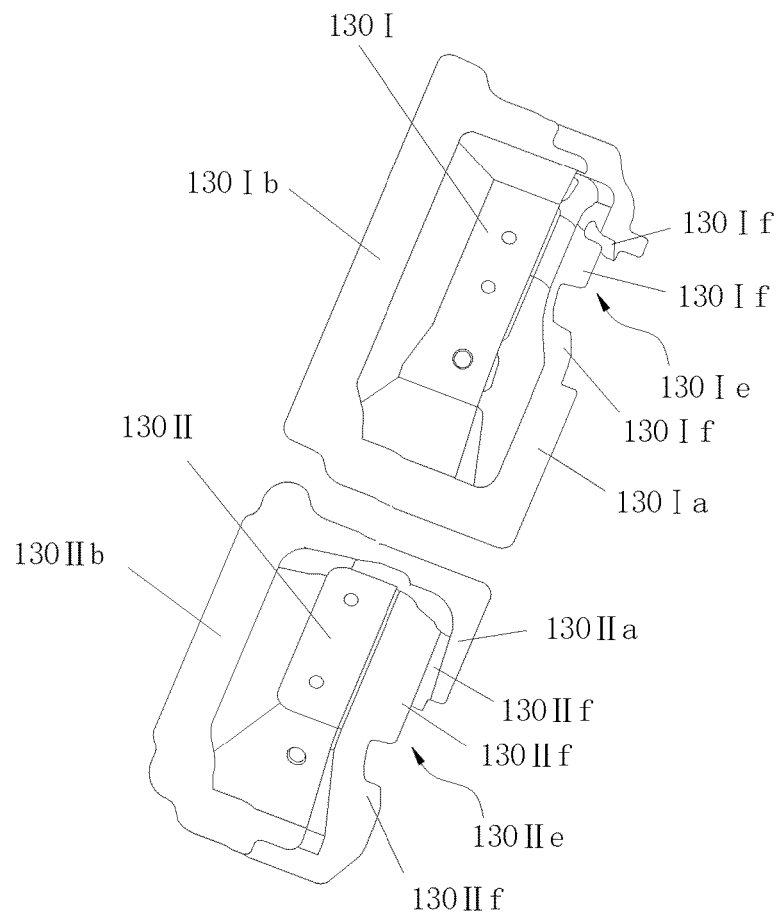
FIG. 36 is a three-dimensional view of a strengthening longitudinal beam of the vehicle body structure according to the fifth implementation of the present disclosure.
Figure 37:
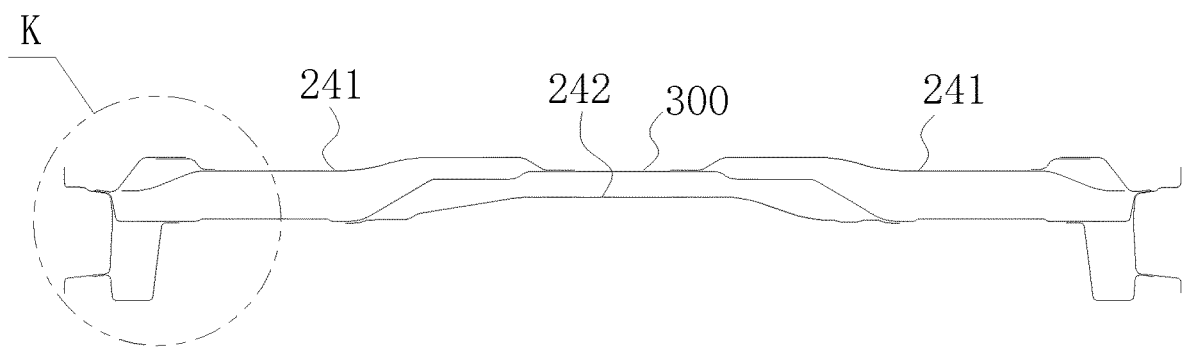
FIG. 37 is a G-G cross sectional view or an H-H cross sectional view of FIG. 34.
Figure 38:
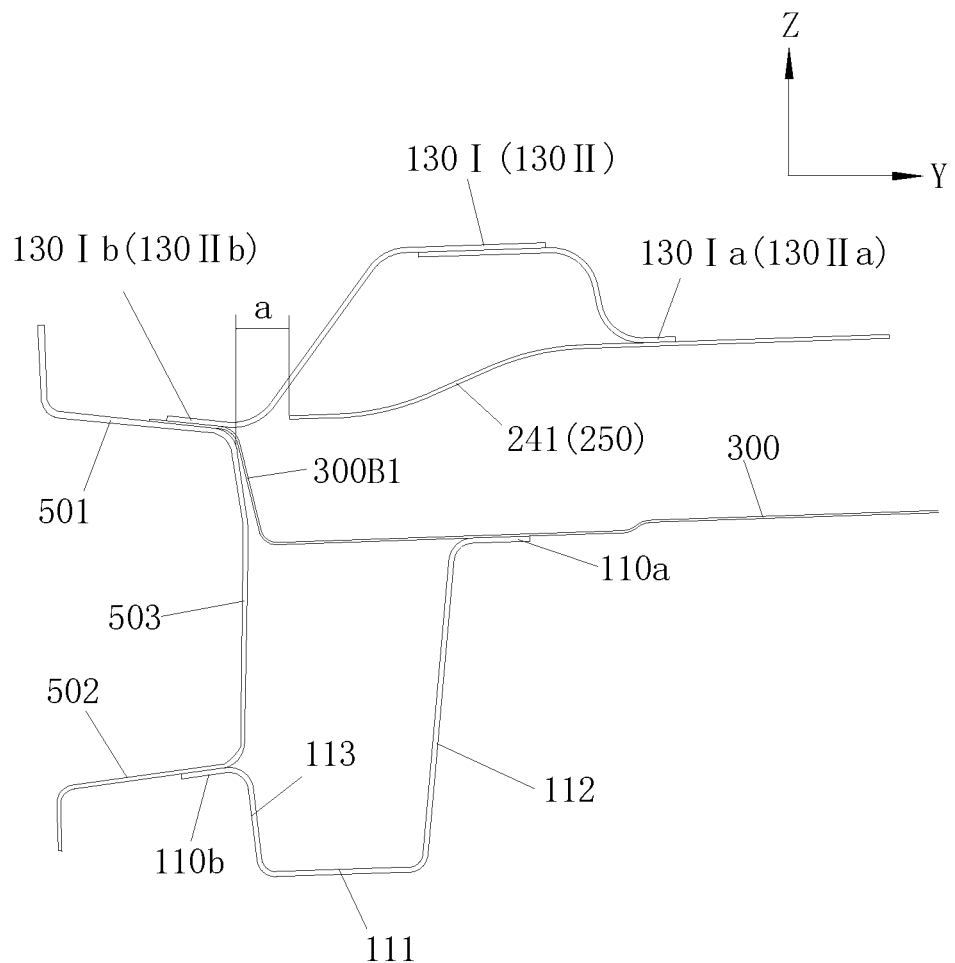
FIG. 38 is an enlarged view of a part K in FIG. 37.

FIG. 34 is a top view of a vehicle body structure according to a fifth implementation of the present disclosure. FIG. 35 is an exploded view of the vehicle body structure according to the fifth implementation of the present disclosure. FIG. 36 is a three-dimensional view of a strengthening longitudinal beam of the vehicle body structure according to the fifth implementation of the present disclosure. A difference between the fifth implementation and the first implementation of the present disclosure includes: the form of the strengthening longitudinal beam. As shown in FIG. 34 to FIG. 36, in the fifth implementation, each strengthening longitudinal beam 130 includes two segments disposed at intervals along the front-rear direction, that is, a front strengthening longitudinal beam 130I and a rear strengthening longitudinal beam 130II. The strengthening crossbeam 240 is connected to the two front strengthening longitudinal beams 130I, and the strengthening crossbeam 250 is connected to the two rear strengthening longitudinal beams 130II. The connection manner between the strengthening crossbeam and the strengthening longitudinal beam may be the same as that in the first implementation, and details are not described herein again.

To ensure that in a side pillar collision test, when a collision position of a rigid pillar is between the front strengthening longitudinal beam 130I and the rear strengthening longitudinal beam 130II, the front strengthening longitudinal beam 130I and/or the rear strengthening longitudinal beam 130II can be fully subject to the force. In this implementation, an interval L between a rear end of the front strengthening longitudinal beam 130I and a front end of the rear strengthening longitudinal beam 130II is less than the diameter of the rigid pillar, for example, less than 254 mm.

Figure 41:
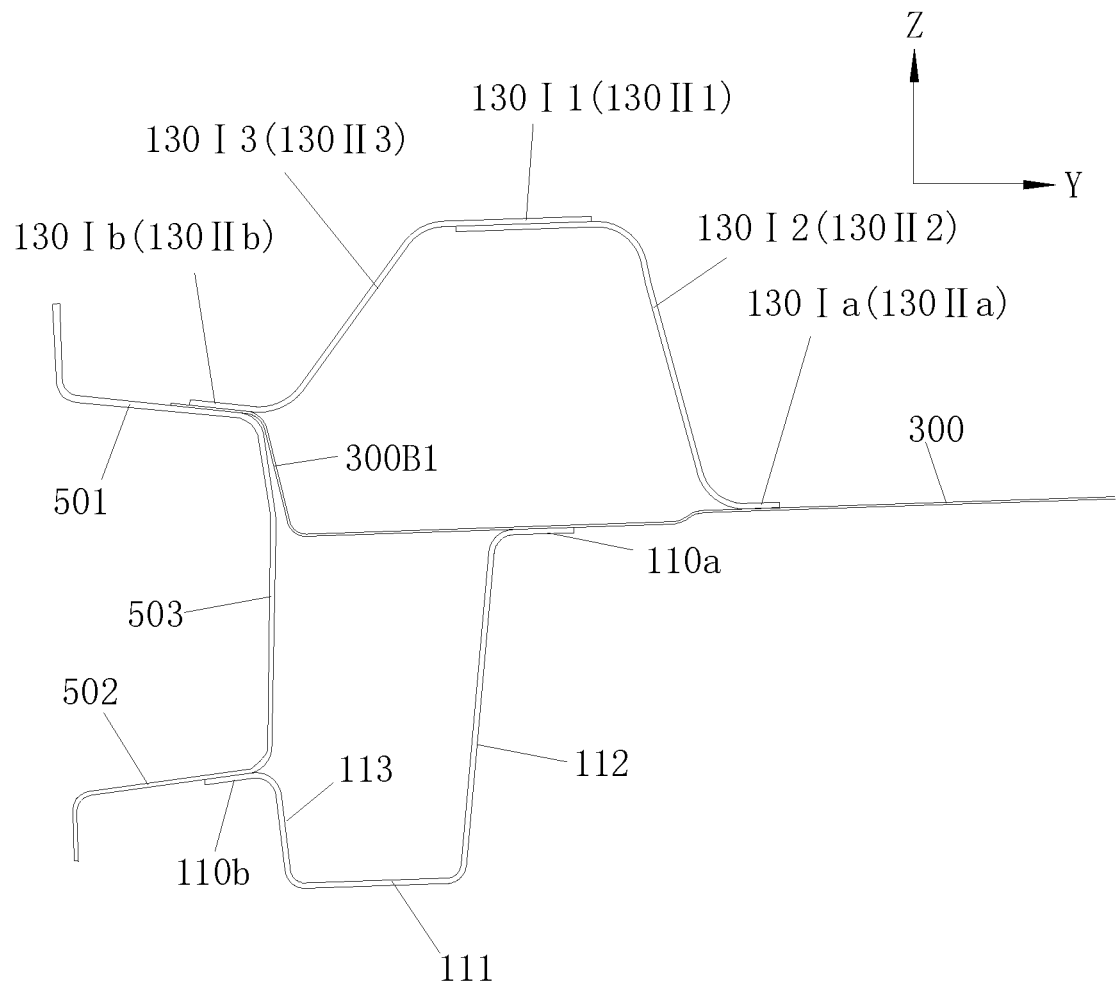
FIG. 41 is an enlarged view of a part M in FIG. 40.

The strengthening longitudinal beam 130I and the strengthening longitudinal beam 130II may have various proper structures, and this is not limited in the present disclosure. In this implementation, as shown in FIG. 41, the front strengthening longitudinal beam 130I may be formed as a groove-shaped structure opening downward, and include a front strengthening longitudinal beam inner side wall 130I2 and a front strengthening longitudinal beam outer side wall 130I3 that are disposed opposite to each other, and a front strengthening longitudinal beam top wall 130I1 connecting the front strengthening longitudinal beam inner side wall 130I2 and the front strengthening longitudinal beam outer side wall 130I3. A front strengthening longitudinal beam inner side flanging 130Ia is formed at a lower edge of the front strengthening longitudinal beam inner side wall 130I2, and a front strengthening longitudinal beam outer side flanging 130Ib is formed at a lower edge of the front strengthening longitudinal beam outer side wall 130I3.

The front strengthening longitudinal beam inner side flanging 130Ia is overlapped with the upper surface of the floor panel 300, the front strengthening longitudinal beam outer side flanging 130Ib is overlapped with the inner plate top wall 501, and the position of the front strengthening longitudinal beam outer side flanging 130Ib may be higher than the position of the front strengthening longitudinal beam inner side flanging 130Ia.

Similarly, the rear strengthening longitudinal beam 130II may be formed as a groove-shaped structure opening downward, and include a rear strengthening longitudinal beam inner side wall 130II2 and a rear strengthening longitudinal beam outer side wall 130II3 that are disposed opposite to each other, and a rear strengthening longitudinal beam top wall 130II1 connecting the rear strengthening longitudinal beam inner side wall 130II2 and the rear strengthening longitudinal beam outer side wall 130II3. A rear strengthening longitudinal beam inner side flanging 130IIa is formed at a lower edge of the rear strengthening longitudinal beam inner side wall 130II2, and a rear strengthening longitudinal beam outer side flanging 130IIb is formed at a lower edge of the rear strengthening longitudinal beam outer side wall 130II3.

The rear strengthening longitudinal beam inner side flanging 130IIa is overlapped with the upper surface of the floor panel 300, the rear strengthening longitudinal beam outer side flanging 130IIb is overlapped with the inner plate top wall 501, and the position of the rear strengthening longitudinal beam outer side flanging 130IIb may be higher than the position of the rear strengthening longitudinal beam inner side flanging 130IIa.

Figure 39:
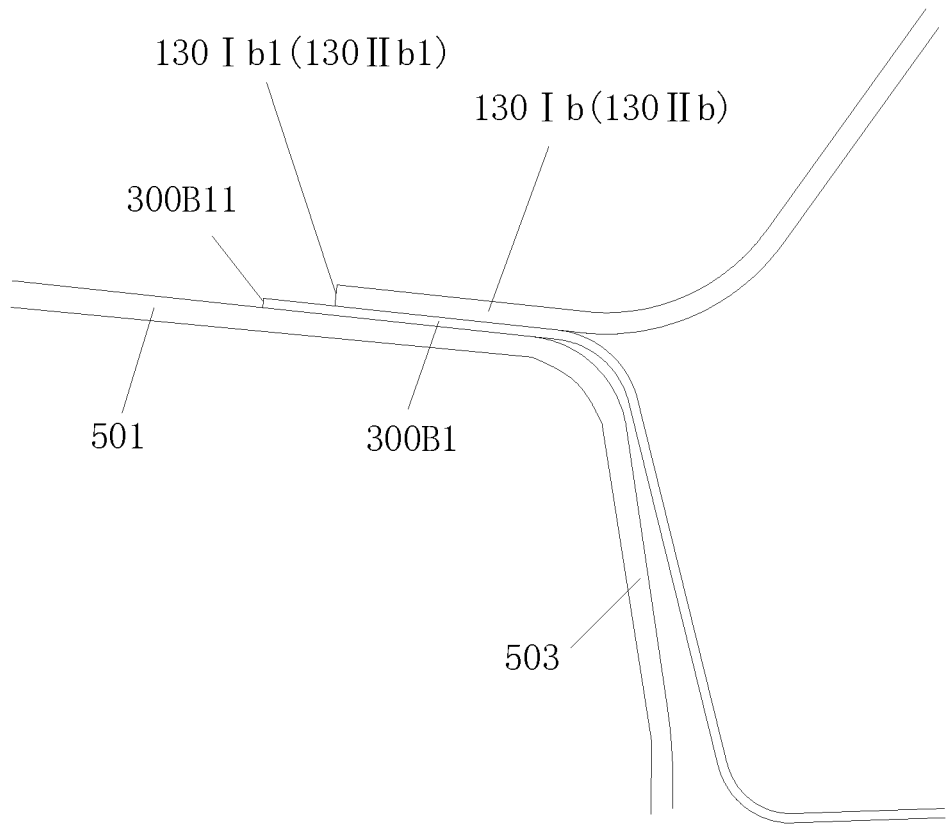
FIG. 39 is a partially enlarged view of FIG. 38.
Figure 40:
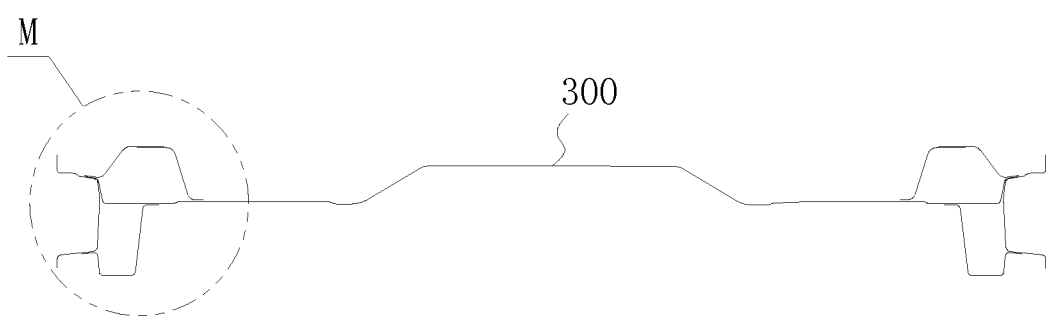
FIG. 40 is an I-I cross sectional view or a J-J cross sectional view of FIG. 34.

Similar to the first implementation, in this implementation, as shown in FIG. 39, the outer edge 300B11 of the first segment flanging 300B1 protrudes out of an outer edge 130Ib1 of the front strengthening longitudinal beam outer side flanging 130Ib and out of an outer edge 130IIb1 of the rear strengthening longitudinal beam outer side flanging 130IIb. The front strengthening longitudinal beam outer side flanging 130Ib, the first segment flanging 300B1, and the inner plate top wall 501 of the sill inner plate 500 are welded together by means of stitch welding, and the rear strengthening longitudinal beam outer side flanging 130IIb, the first segment flanging 300B1, and inner plate top wall 501 of the sill inner plate 500 are welded together by means of stitch welding.

Figure 42:
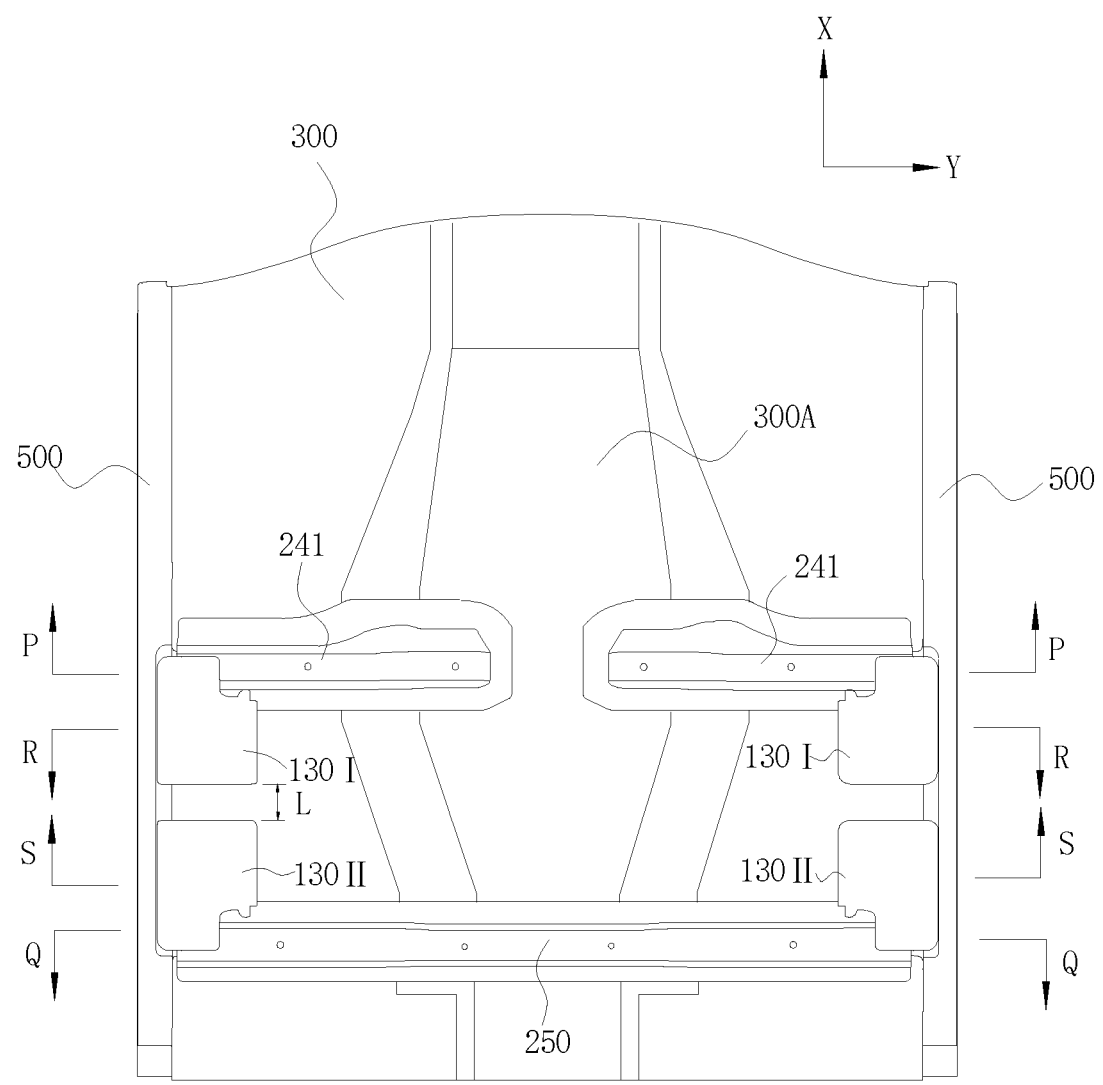
FIG. 42 is a top view of a vehicle body structure according to a sixth implementation of the present disclosure.
Figure 43:
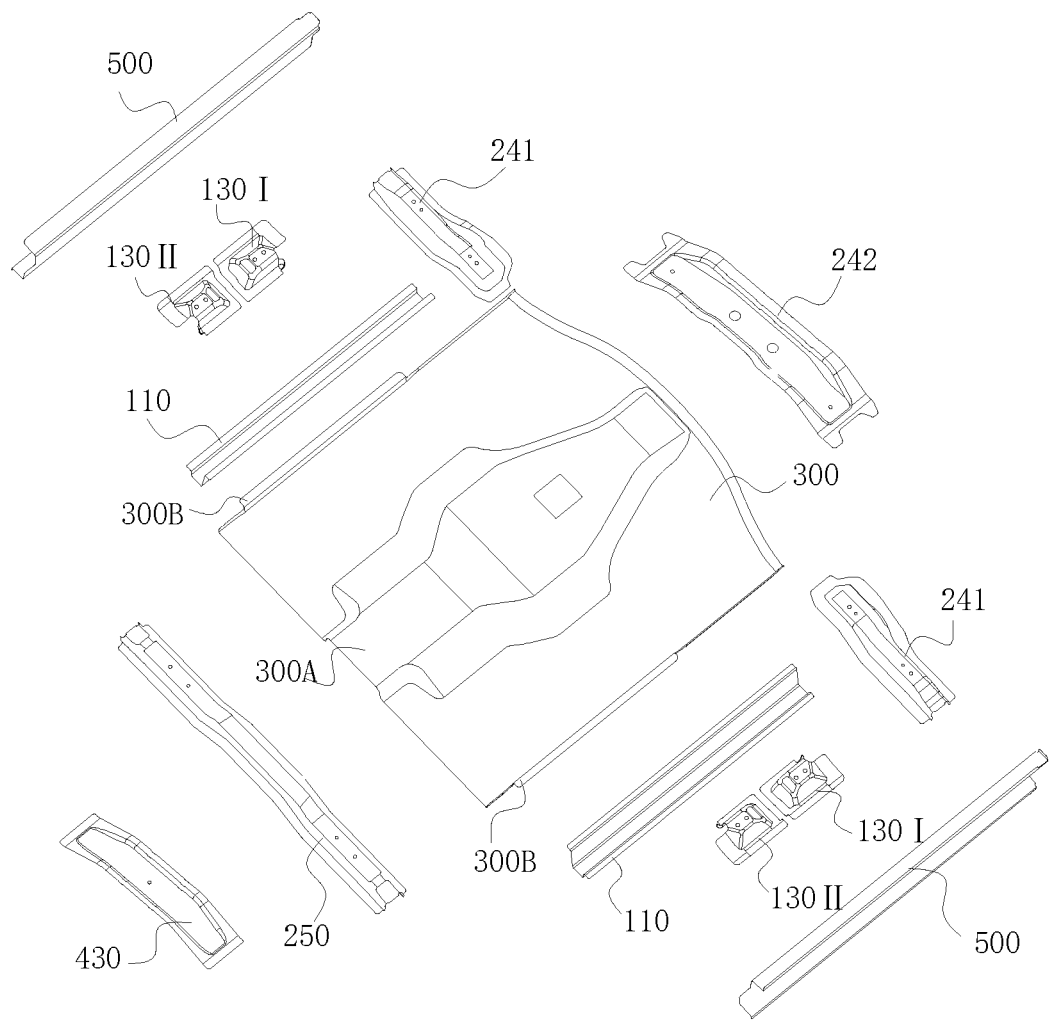
FIG. 43 is an exploded view of the vehicle body structure according to the sixth implementation of the present disclosure.
Figure 44:
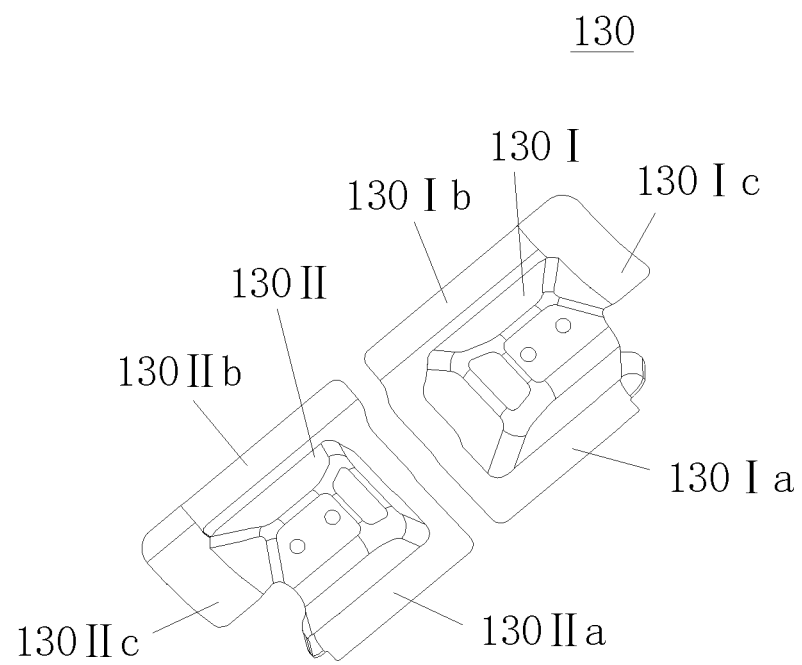
FIG. 44 is a three-dimensional view of a strengthening longitudinal beam of the vehicle body structure according to the sixth implementation of the present disclosure.

FIG. 42 is a top view of a vehicle body structure according to a sixth implementation of the present disclosure. FIG. 43 is an exploded view of the vehicle body structure according to the sixth implementation of the present disclosure. FIG. 44 is a three-dimensional view of a strengthening longitudinal beam of the vehicle body structure according to the sixth implementation of the present disclosure.

A difference between the sixth implementation and the second implementation of the present disclosure includes: the form of the strengthening longitudinal beam. As shown in FIG. 42 to FIG. 44, in the sixth implementation, each strengthening longitudinal beam 130 includes two segments disposed at intervals along the front-rear direction, that is, a front strengthening longitudinal beam 130I and a rear strengthening longitudinal beam 130II. The strengthening crossbeam 240 is connected to the two front strengthening longitudinal beams 130I, and the strengthening crossbeam 250 is connected to the two rear strengthening longitudinal beams 130II.

A difference between the sixth implementation and the fifth implementation of the present disclosure includes: the connection manner between the strengthening crossbeam and the strengthening longitudinal beam. As shown in FIG. 42 to FIG. 44, in the sixth implementation, front ends of the two front strengthening longitudinal beams 130I are connected to the strengthening crossbeam 240, and rear ends of the two rear strengthening longitudinal beams 130II are connected to the strengthening crossbeam 250.

Figure 45:
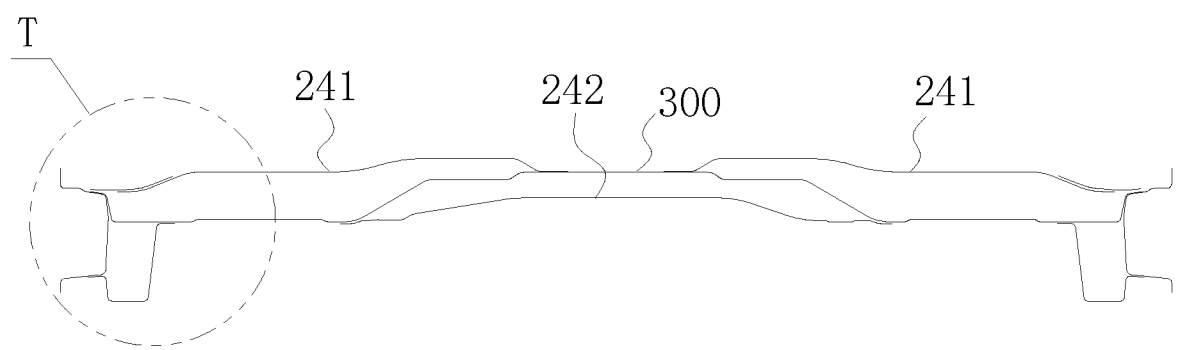
FIG. 45 is a P-P cross sectional view or a Q-Q cross sectional view of FIG. 42.
Figure 46:
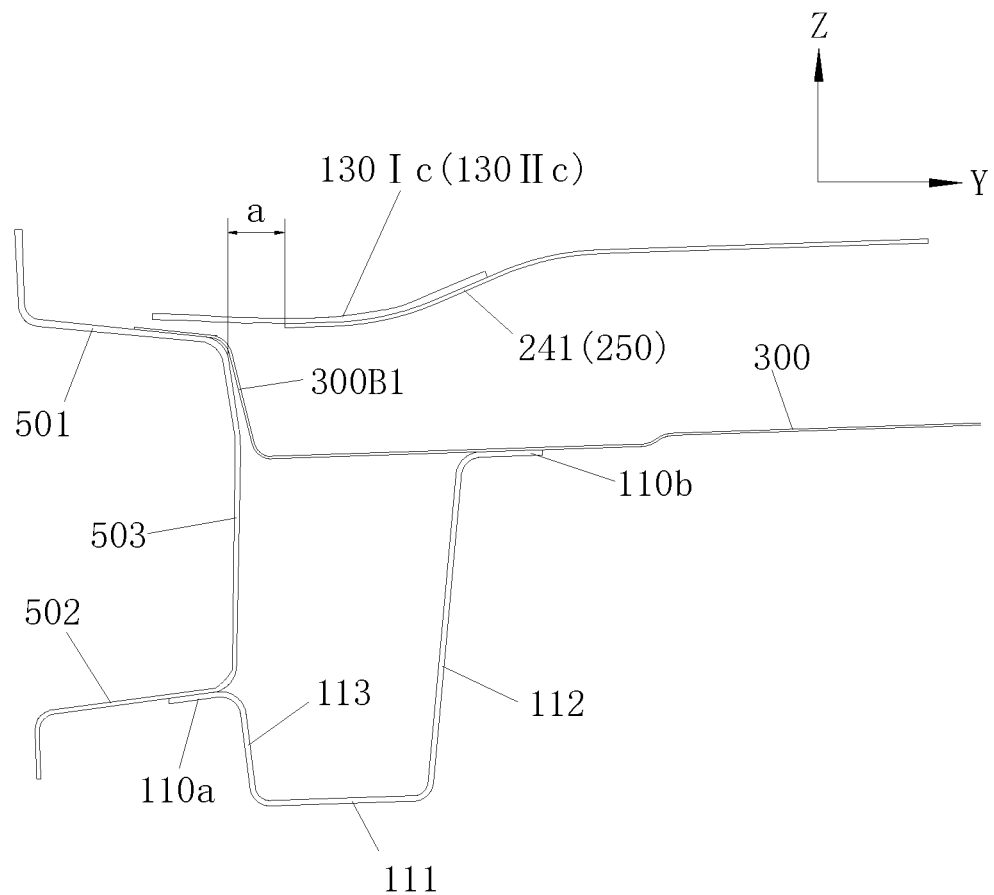
FIG. 46 is an enlarged view of a part Tin FIG. 45.
Figure 47:
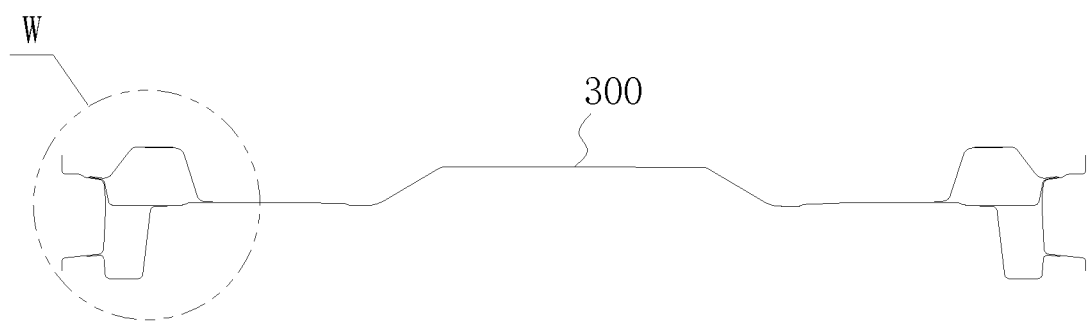
FIG. 47 is an R-R cross sectional view or an S-S cross sectional view of FIG. 42.
Figure 48:
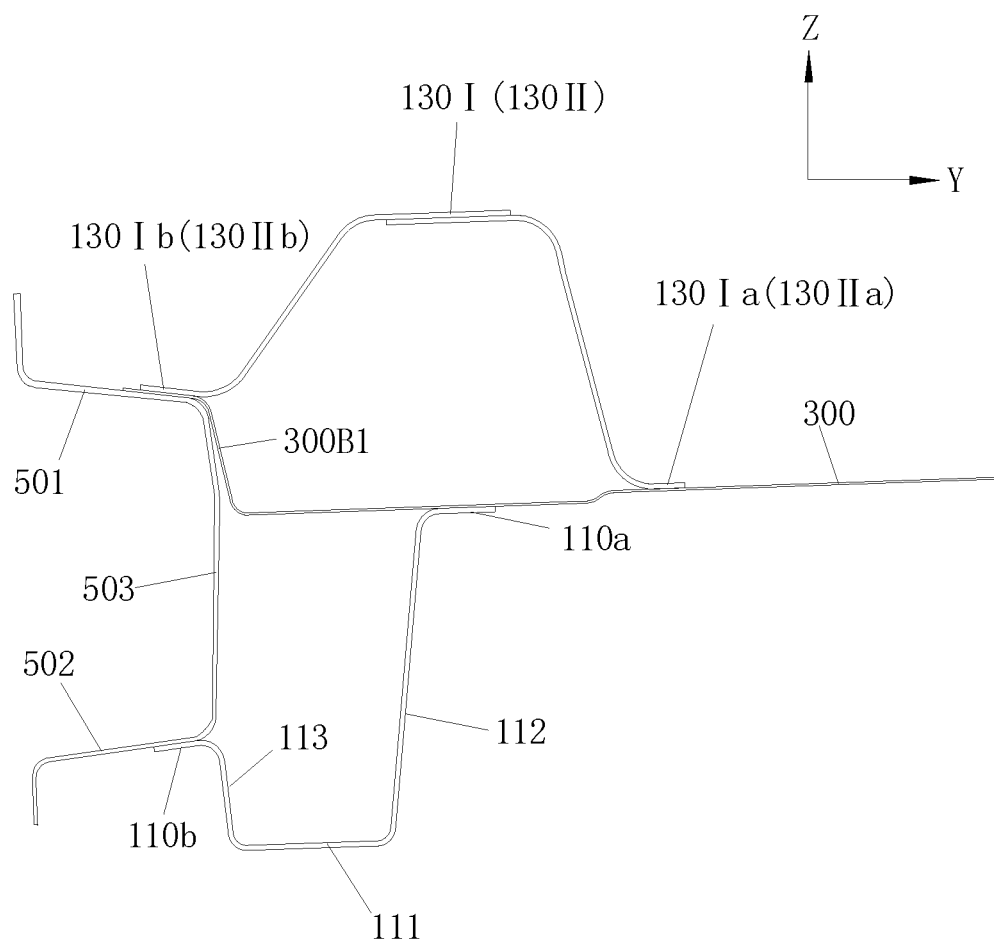
FIG. 48 is an enlarged view of a part W in FIG. 47.
Figure 49:
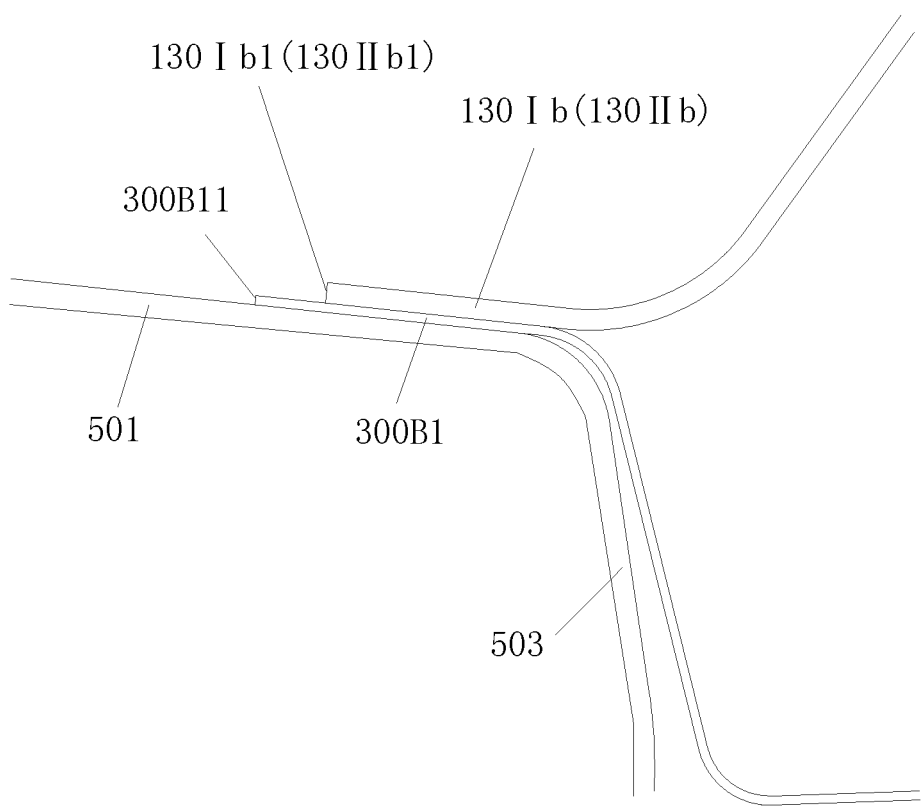
FIG. 49 is a partial enlarged view of FIG. 48.

In this implementation, as shown in FIG. 44 to FIG. 46, the front end of the front strengthening longitudinal beam 130I has a front strengthening longitudinal beam front end flanging 130Ic, the rear end of the rear strengthening longitudinal beam 130II has a rear strengthening longitudinal beam rear end flanging 130IIc. The front strengthening longitudinal beam front end flanging 130Ic is connected to the front strengthening crossbeam 240, and the rear strengthening longitudinal beam rear end flanging 130IIc is connected to the rear strengthening crossbeam 250.

Figure 50:
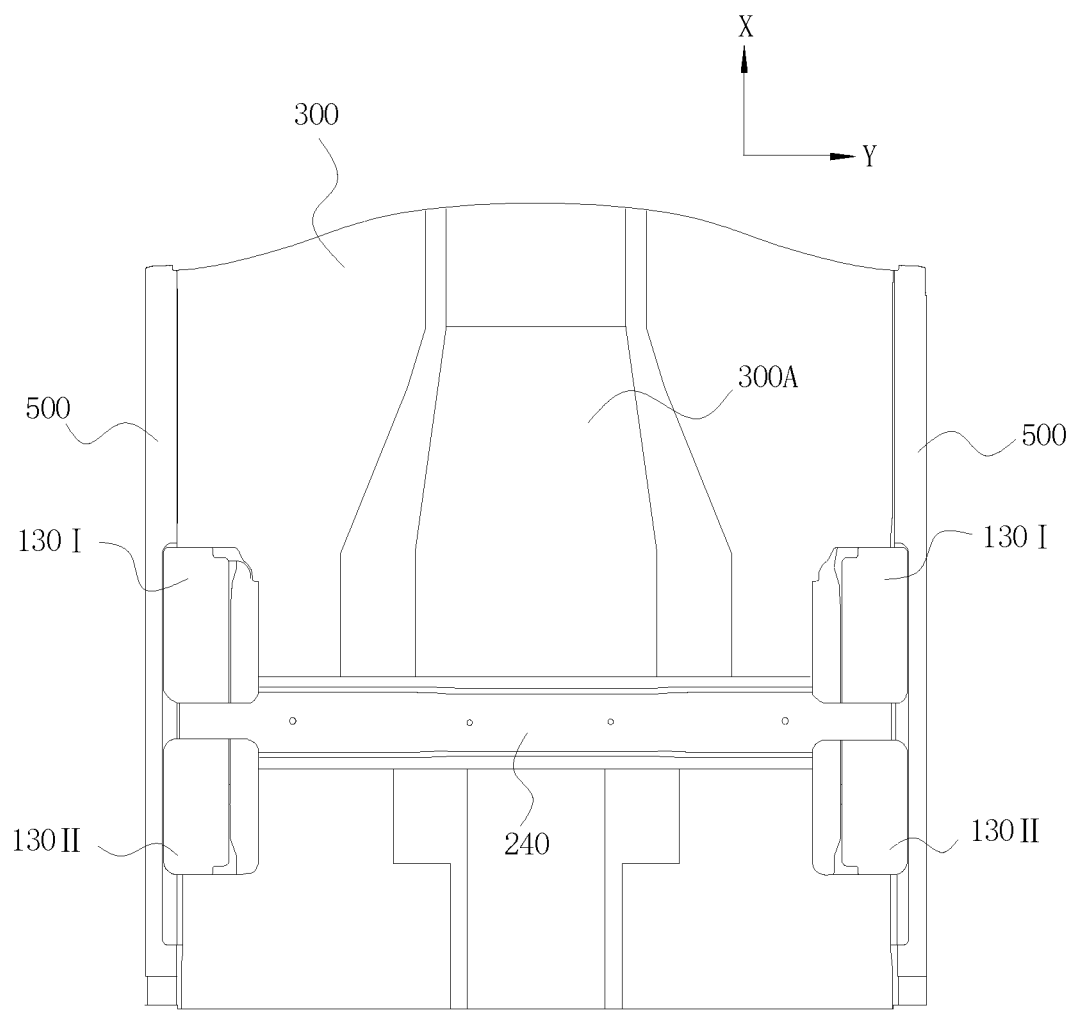
FIG. 50 is a top view of a vehicle body structure according to a seventh implementation of the present disclosure.

FIG. 50 is a top view of a vehicle body structure according to a seventh implementation of the present disclosure. A difference between the seventh implementation and the fifth implementation of the present disclosure includes: in the seventh implementation, by using one strengthening crossbeam 240, the two front strengthening longitudinal beams 130I are connected and the two rear strengthening longitudinal beams 130II are connected. That is, the strengthening crossbeam 240 is connected to both the two front strengthening longitudinal beams 130I and the two rear strengthening longitudinal beams 130II.

Figure 51:
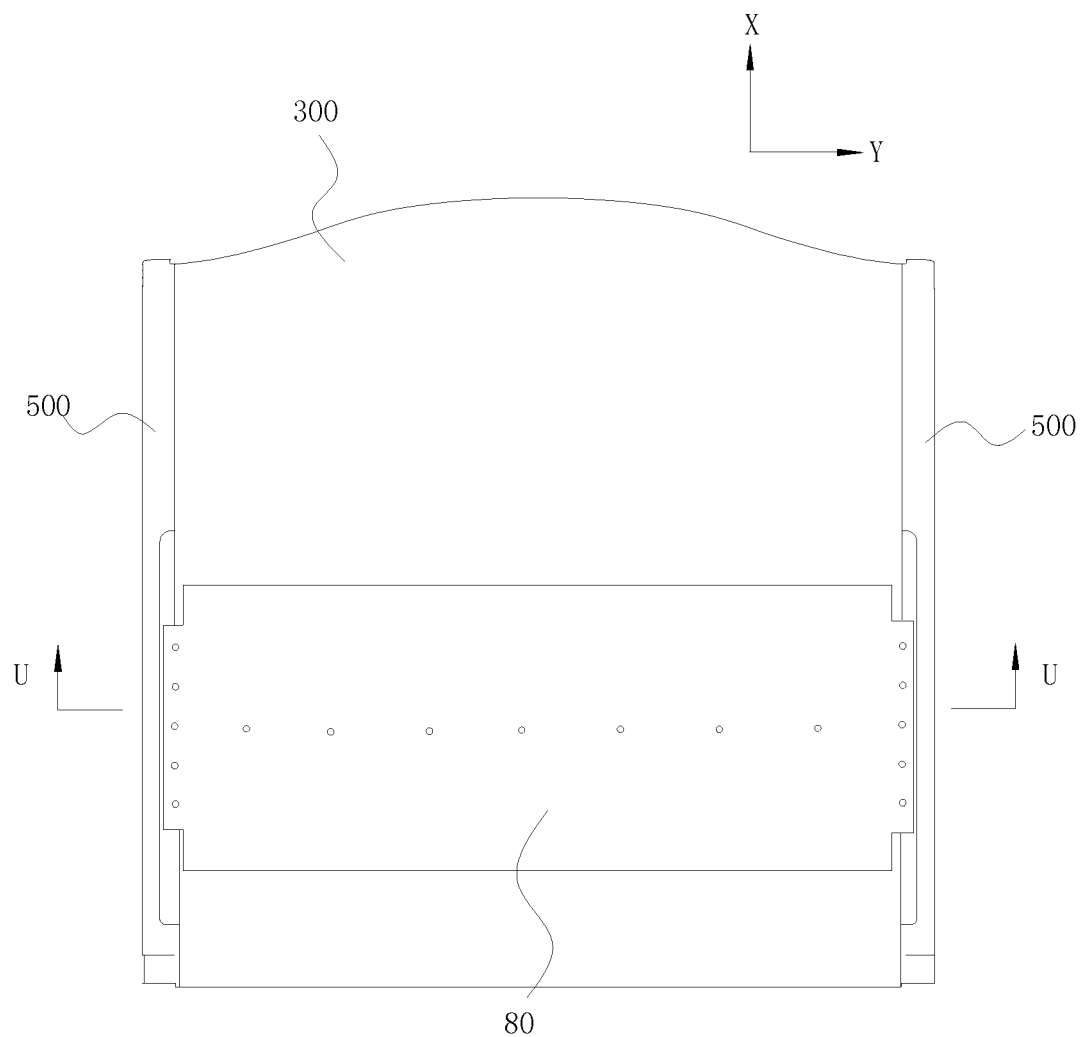
FIG. 51 is a top view of a vehicle body structure according to an eighth implementation of the present disclosure.
Figure 52:
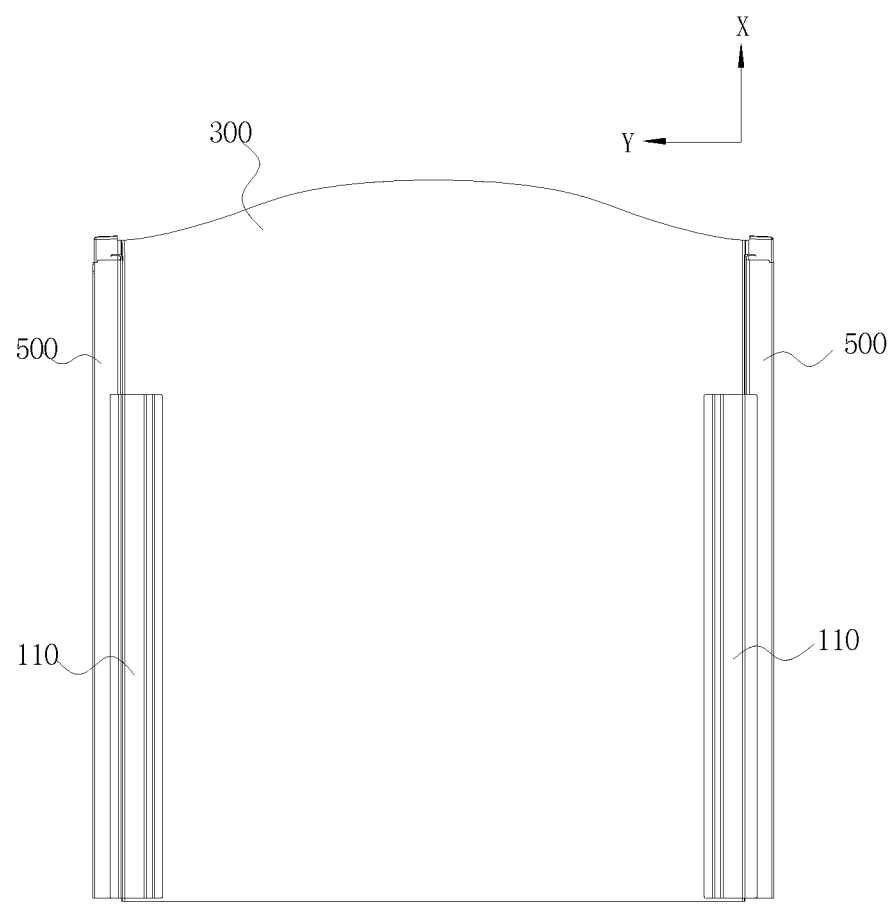
FIG. 52 is a bottom view of the vehicle body structure according to the eighth implementation of the present disclosure.
Figure 53:
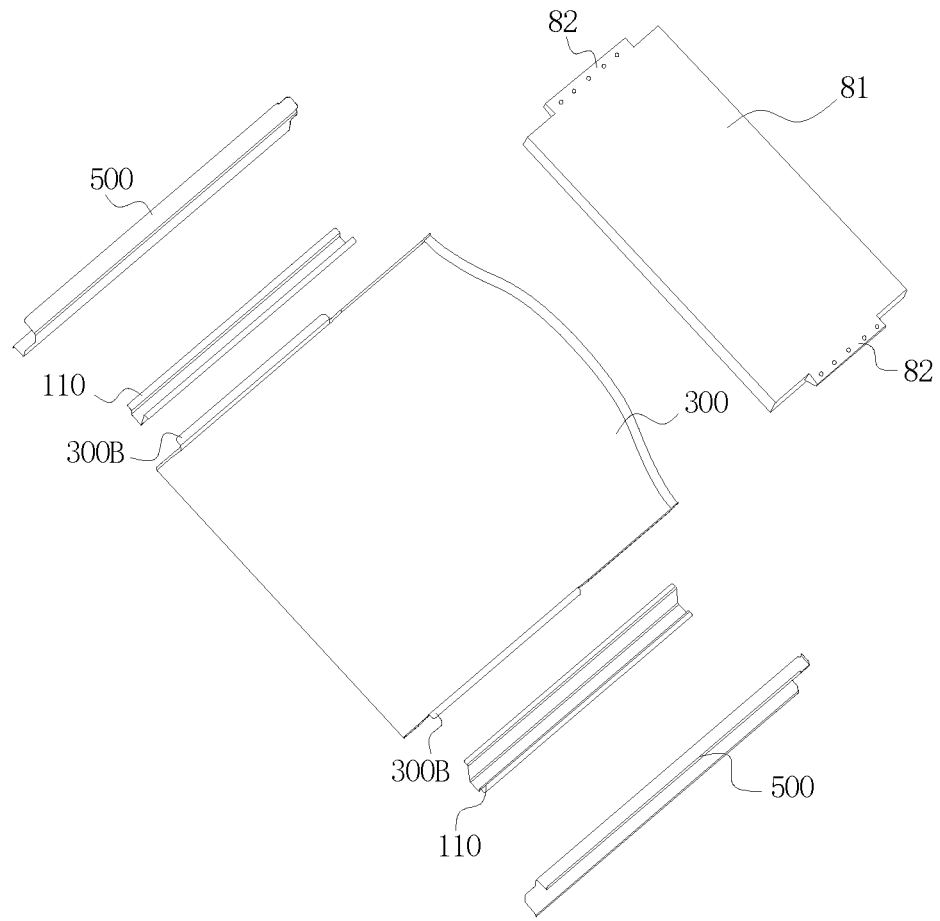
FIG. 53 is an exploded view of the vehicle body structure according to the eighth implementation of the present disclosure.
Figure 54:
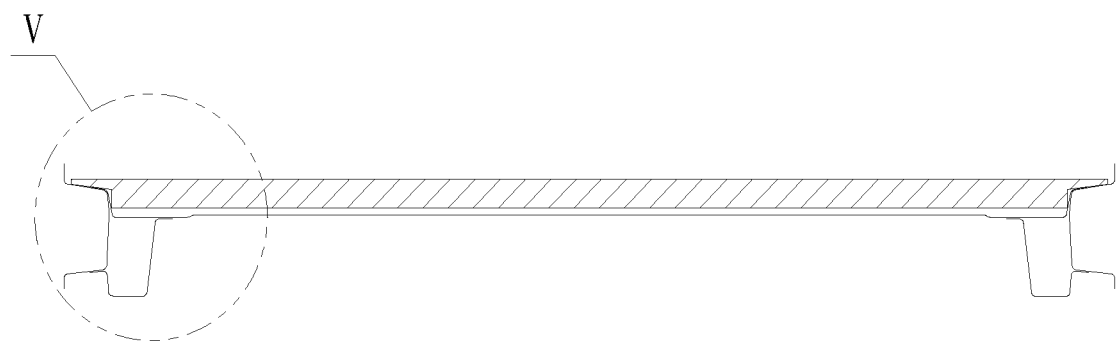
FIG. 54 is a U-U cross sectional view of FIG. 51.

FIG. 51 is a top view of a vehicle body structure according to an eighth implementation of the present disclosure. FIG. 52 is a bottom view of the vehicle body structure according to the eighth implementation of the present disclosure. FIG. 53 is an exploded view of the vehicle body structure according to the eighth implementation of the present disclosure. As shown in FIG. 51 to FIG. 53, the vehicle body structure according to the eighth implementation of the present disclosure includes the floor panel 300, a floor strengthening plate 80, and two sill inner plates 500. The two sill inner plates 500 are respectively disposed on the left side and the right side of the floor panel 300 in a one-to-one correspondence, the floor strengthening plate 80 covers on the floor panel 300, and a left side and a right side of the floor strengthening plate 80 are respectively connected to the two sill inner plates 500 in a one-to-one correspondence. The floor strengthening plate 80 forms a sill horizontal support structure, to support the sill inner plates 500 on the left side and the right side.

A difference between the eighth implementation and the seventh implementation of the present disclosure includes: in the eighth implementation, the two sill inner plates 500 are connected by using one floor strengthening plate 80. When a side collision occurs to the vehicle, by using the sill horizontal support structure formed by the floor strengthening plate 80, the collision force can be directly transferred from the sill inner plate 500 on one side to the sill inner plate 500 on the other side, and the floor panel 300 basically does not participate or rarely participates in the impact transmission and energy absorbing, so that horizontal deformations of the floor panel 300 and the sill inner plate 500 can be obviously reduced, the passengers are prevented from being hurt, and the battery pack disposed below the floor panel 300 is prevented from being damaged.

The floor strengthening plate 80 may be disposed at any proper longitudinal position. In this implementation, the floor strengthening plate 80 may generally correspond to the B pillar 800 in the horizontal direction of the vehicle. Because the B pillar 800 is connected to the sill inner plate 500, by disposing the floor strengthening plate 80 at a position generally corresponding to the B pillar 800, the connected part of the sill inner plate 500 and the B pillar 800 can be pointedly strengthened, so that the intruding deformation of the B pillar 800 in the in-vehicle direction can be more effectively reduced.

In this implementation, a front edge of the floor strengthening plate 80 may be located in front of the front edge 801 of the B pillar 800, and a rear edge of the floor strengthening plate 80 may be located between the front edge 801 and the rear edge 802 of the B pillar 800. For example, the width (the size in a vertical direction of the vehicle) of the floor strengthening plate 80 may be 300 to 500 mm.

In the present disclosure, to improve the mounting strength of the front seat and ensure the safety of the passenger seated at the front seat, a front seat mounting point may be disposed on the floor strengthening plate 80. That is, the front seat may be mounted on the floor strengthening plate 80.

Figure 55:
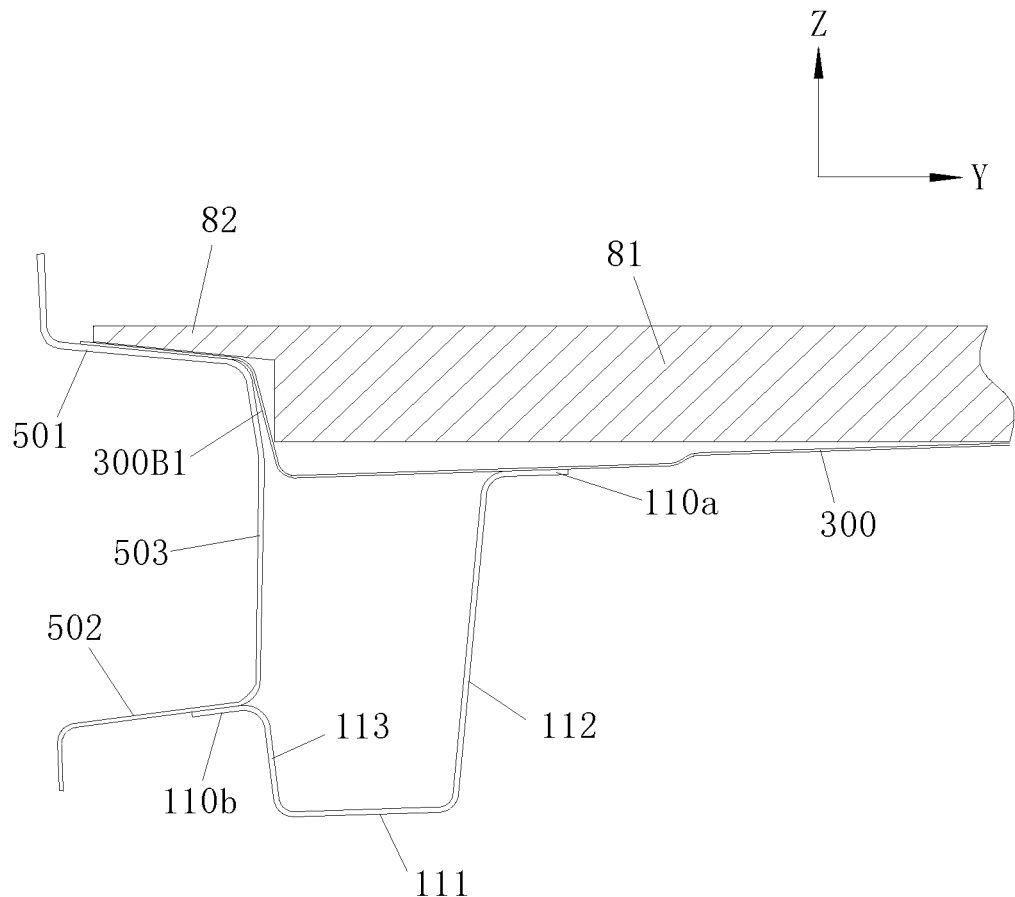
FIG. 55 is an enlarged view of a part V in FIG. 54.

The floor strengthening plate 80 may have various proper structures, and this is not limited in the present disclosure. In some implementations, as shown in FIG. 53 and FIG. 55, the floor strengthening plate 80 includes a main body portion 81 and two connecting portions 82 on a left side and a right side of the main body portion 81. The main body portion 81 is generally formed as a rectangular plate structure and matches with the cross-sectional shape of the floor panel 300, and the connecting portion 82 is formed as a strip plate structure extending in the front-rear direction. The main body portion 81 is located above the floor panel 300, the connecting portion 82 is connected to an upper surface of the sill inner plate 500, the main body portion 81 is connected to the floor panel 300, and the thickness of the main body portion 81 is larger than the thickness of the connecting portion 82. Specifically, the main body portion 81 may be connected to the floor panel 300 by using rivets or bolts, and the connection point 82 may be connected to the sill inner plate 500 by using rivets or bolts.

Figure 56:
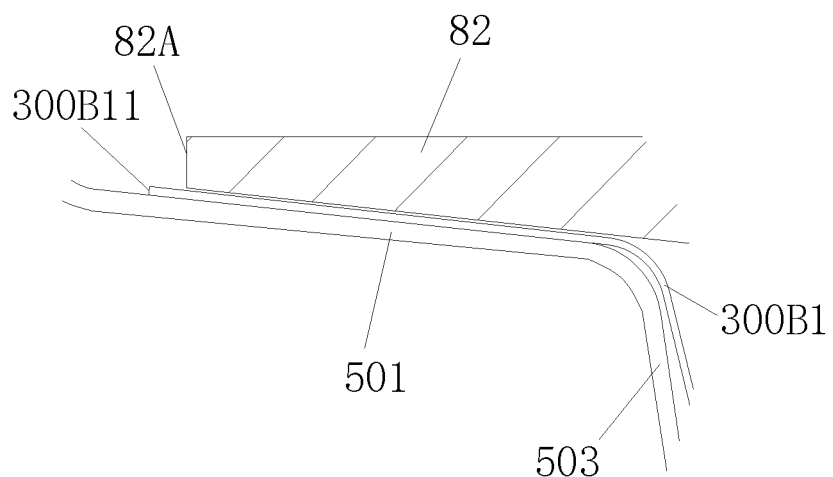
FIG. 56 is a partial enlarged view of FIG. 55.
Figure 57:
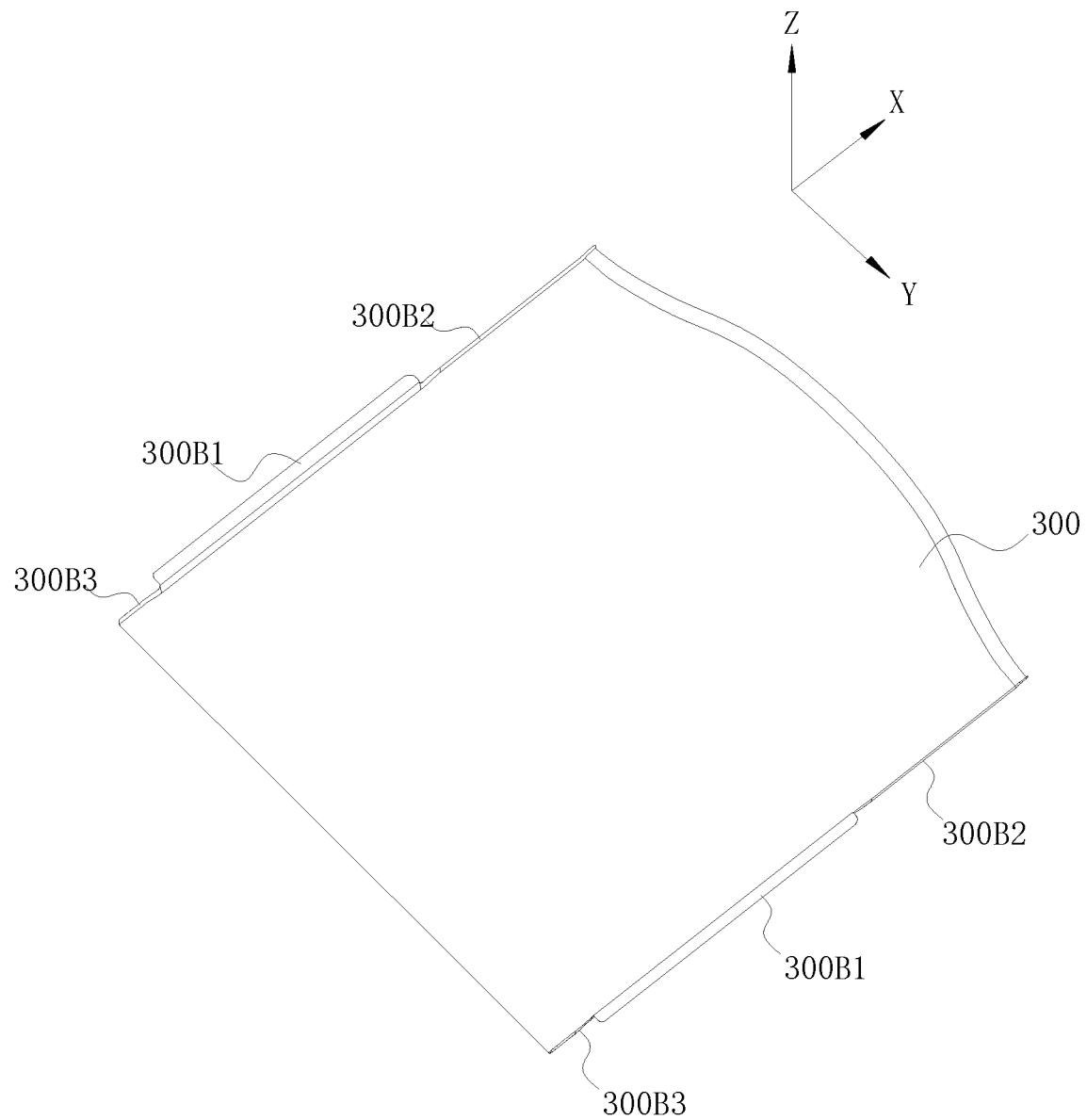
FIG. 57 is a three-dimensional view of a floor panel of the vehicle body structure according to the eighth implementation of the present disclosure.

As shown in FIG. 53, to facilitate the connection to the sill inner plate 500, the left side and the right side of the floor panel 300 may have the floor panel flanging 300B. Usually, to prevent water from flowing into the interior of the vehicle, a sealant needs to be applied between the floor panel flanging 300B and the sill inner plate 500. In this implementation, because the connecting portion 82 covers on the sill inner plate 500, for ease of the applying of the sealant, as shown in FIG. 57, the floor panel flanging 300B may include the first segment flanging 300B1 corresponding to the position of the strengthening longitudinal beam 130, the second segment flanging 300B2 located in front of the first segment flanging 300B1, and the third segment flanging 300B3 located behind the first segment flanging 300B1. As shown in FIG. 55 and FIG. 56, the cross section of the first segment flanging 300B1 is L-shaped, and the outer edge 300B11 of the first segment flanging 300B1 protrudes out of an outer edge 82A of the connecting portion 82. The connecting portion 82, the first segment flanging 300B1, and the sill inner plate 500 are connected together, and the first segment flanging 300B1 is located between the connecting portion 82 and the sill inner plate 500. In this case, the sealant may be applied between the outer edge 300B11 of the first segment flanging 300B1 and the upper surface 11B of the sill inner plate 500. The cross section of the second segment flanging 300B2 and the third segment flanging 300B3 may be a shape of a horizontal line, and the second segment flanging 300B2 and the third segment flanging 300B3 may be connected to the inner plate side wall 503 of the sill inner plate 500.

A vehicle is provided according to another aspect of the present disclosure, where the vehicle includes the foregoing vehicle body structure.

The vehicle body structure assembly of the present disclosure is not only applicable to an electric vehicle, but also applicable to a common fuel vehicle. In addition to being used to protect the battery pack, the vehicle body structure of the present disclosure can also provide a function of strengthening the vehicle body and increasing a living space of the passengers.

Although the implementations of the present disclosure are described in detail above with reference to the accompanying drawings, the present disclosure is not limited to specific details in the foregoing implementations. Various simple variations can be made to the technical solutions of the present disclosure within the scope of the technical idea of the present disclosure, and such simple variations all fall within the protection scope of the present disclosure. For example, although only one or two strengthening crossbeams are listed above, a person skilled in the art easily understands that there may be alternatively a plurality of strengthening crossbeams.

It should be further noted that the specific technical features described in the foregoing implementations can be combined in any appropriate manner provided that no conflict occurs. To avoid unnecessary repetition, various possible combination manners will not be described in the present disclosure.

In addition, various different implementations of the present disclosure may be alternatively combined randomly. Such combinations should also be considered as the content disclosed in the present disclosure provided that these combinations do not depart from the concept of the present disclosure.

What is claimed is:

1. A vehicle body structure, comprising:
   two sill inner plates, disposed at intervals along a left-right direction;
   two strengthening longitudinal beams, disposed at intervals along the left-right direction;
   at least one strengthening crossbeam; and
   a floor panel;
   wherein each strengthening longitudinal beam is connected to one corresponding sill inner plate, and each strengthening crossbeam is connected to the two strengthening longitudinal beams;
   wherein the two sill inner plates are respectively located on a left side and a right side of the floor panel, the strengthening longitudinal beam is disposed above the floor panel, one side of each strengthening longitudinal beam is connected to one corresponding sill inner plate, and the other side is connected to an upper surface of the floor panel.

2. The vehicle body structure according to claim 1, wherein the strengthening longitudinal beam generally corresponds to a B pillar in a horizontal direction of a vehicle.

3. The vehicle body structure according to claim 1, wherein a gap exists between an end portion of each strengthening crossbeam and the corresponding sill inner plate.

4. The vehicle body structure according to claim 1, wherein the at least one strengthening crossbeam comprises two crossed strengthening crossbeams.

5. The vehicle body structure according to claim 1, wherein the sill inner plate is formed as a groove-shaped structure opening outward, and comprises an inner plate top wall and an inner plate bottom wall that are disposed opposite to each other, and an inner plate side wall connecting the inner plate top wall and the inner plate bottom wall, wherein the left side and the right side of the floor panel comprise a floor panel flanging, the floor panel flanging comprises a first segment flanging corresponding to the position of the strengthening longitudinal beam, a cross section of the first segment flanging is in an "L" shape, and the first segment flanging is overlapped with the inner plate top wall.

6. The vehicle body structure according to claim 5, wherein the strengthening longitudinal beam has an inner side flanging of the strengthening longitudinal beam and an outer side flanging of the strengthening longitudinal beam, the inner side flanging of the strengthening longitudinal beam is overlapped with the upper surface of the floor panel, the outer side flanging of the strengthening longitudinal beam is overlapped with the first segment flanging, and the outer side flanging of the strengthening longitudinal beam, the first segment flanging, and the inner plate top wall are connected to each other.

7. The vehicle body structure according to claim 6, wherein an outer edge of the first segment flanging protrudes out of an outer edge of the outer side flanging of the strengthening longitudinal beam.

8. The vehicle body structure according to claim 1, wherein a central channel protruding upward is formed on the floor panel, the height of the central channel is less than 50 mm, the central channel comprises a central channel top wall and two central channel side walls, and the at least one strengthening crossbeam comprises two parallel strengthening crossbeams disposed at intervals along a front-rear direction, a front strengthening crossbeam of the two strengthening crossbeams comprises two upper crossbeam segments disposed at intervals and a lower crossbeam segment connecting the two upper crossbeam segments, each upper crossbeam segment is located above the floor panel and connected to one corresponding strengthening longitudinal beam, the lower crossbeam segment is located below the central channel, and each upper crossbeam segment is connected to the corresponding crossbeam side wall and the lower crossbeam segment; and a rear strengthening crossbeam of the two strengthening crossbeams is disposed above the floor panel and across the central channel.

9. The vehicle body structure according to claim 8, wherein the vehicle body structure further comprises a central channel strengthening beam, the central channel strengthening beam is disposed below the floor panel and corresponds to the position of the rear strengthening crossbeam of the two strengthening crossbeams, and two ends of the central channel strengthening beam are respectively connected to the two central channel side walls.

10. The vehicle body structure according to claim 1, wherein a central channel protruding upward is formed on the floor panel, the height of the central channel is less than 50 mm, and each strengthening crossbeam is located above the floor panel and across the central channel.

11. The vehicle body structure according to claim 1, wherein the at least one strengthening crossbeams is disposed above the floor panel.

12. The vehicle body structure according to claim 1, wherein a front end and a rear end of the strengthening longitudinal beam are closed.

13. The vehicle body structure according to claim 1, wherein an opening is formed on the strengthening longitudinal beam, an end portion of the strengthening crossbeam passes through the opening to extend into the interior of the strengthening longitudinal beam, an opening flanging is formed at an edge of the opening, and the opening flanging is overlapped with the strengthening crossbeam.

14. A vehicle, comprising the vehicle body structure according to claim 1.

15. The vehicle body structure according to claim 2, wherein a gap exists between an end portion of each strengthening crossbeam and the corresponding sill inner plate.

16. The vehicle body structure according to claim 15, wherein the at least one strengthening crossbeam comprises two crossed strengthening crossbeams.

17. The vehicle body structure according to claim 16, wherein the vehicle body structure further comprises a floor panel, the two sill inner plates are respectively located on a left side and a right side of the floor panel, the strengthening longitudinal beam is disposed above the floor panel, one side of each strengthening longitudinal beam is connected to one corresponding sill inner plate, and the other side is connected to an upper surface of the floor panel.

18. The vehicle body structure according to claim 17, wherein the sill inner plate is formed as a groove-shaped structure opening outward, and comprises an inner plate top wall and an inner plate bottom wall that are disposed opposite to each other, and an inner plate side wall connecting the inner plate top wall and the inner plate bottom wall, wherein the left side and the right side of the floor panel comprise a floor panel flanging, the floor panel flanging comprises a first segment flanging corresponding to the position of the strengthening longitudinal beam, a cross section of the first segment flanging is in an "L" shape, and the first segment flanging is overlapped with the inner plate top wall.

19. The vehicle body structure according to claim 1, wherein the at least one strengthening crossbeam comprises a first strengthening crossbeam and a second strengthening crossbeam, and wherein the first strengthening crossbeam is disposed below the floor panel and the second strengthening crossbeam is disposed above the floor panel.

20. The vehicle body structure according to claim 1, wherein each strengthening longitudinal beam comprises a front strengthening longitudinal beam and a rear strengthening longitudinal beam.

* * * * *